United States Patent
Jakoby et al.

(10) Patent No.: US 9,532,370 B2
(45) Date of Patent: Dec. 27, 2016

(54) APPARATUS, METHOD AND SYSTEM OF CONTROLLING COMMUNICATIONS OF A MULTI-RADIO DEVICE

(71) Applicant: INTEL CORPORATION, Santa Clara, CA (US)

(72) Inventors: Assi Jakoby, Herzelia (IL); Keren Dor, Herzelyia (IL); Dor Chay, Tel-Aviv (IL); Dongsheng Bi, Fremont, CA (US); Itzik Shahar, Kadima (IL); Bruno Jechoux, Antibes (FR); Ido Ouzieli, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 14/472,404

(22) Filed: Aug. 29, 2014

(65) Prior Publication Data

US 2016/0066339 A1  Mar. 3, 2016

(51) Int. Cl.
*H04W 72/12* (2009.01)
*H04W 88/06* (2009.01)

(52) U.S. Cl.
CPC ......... *H04W 72/1215* (2013.01); *H04W 88/06* (2013.01)

(58) Field of Classification Search
USPC .............................. 455/553.1, 78, 88, 556.1
See application file for complete search history.

(56) References Cited

U.S. PATENT DOCUMENTS

| | | | | |
|---|---|---|---|---|
| 8,046,024 | B2 * | 10/2011 | Sudak | H04W 52/287 455/40 |
| 8,244,944 | B1 * | 8/2012 | Wong | H04W 48/02 370/329 |
| 9,002,282 | B1 * | 4/2015 | de la Broise | H04B 1/40 375/144 |
| 9,131,523 | B2 * | 9/2015 | HomChaudhuri | H04W 72/1257 |
| 2009/0054009 | A1 * | 2/2009 | Yang | H04W 16/14 455/78 |
| 2014/0140381 | A1 * | 5/2014 | Sang | H04B 1/406 375/219 |
| 2015/0072627 | A1 * | 3/2015 | Balasubramanian | H04B 15/02 455/77 |

* cited by examiner

*Primary Examiner* — Edward Urban
*Assistant Examiner* — Ralph H Justus
(74) *Attorney, Agent, or Firm* — Shichrur & Co.

(57) ABSTRACT

Some demonstrative embodiments include devices, systems and methods of controlling communications of a multi-radio device. For example, a multi-radio device may include a first radio to communicate over a first wireless network; a first controller to control the first radio; a second radio to communicate over a second wireless network; a second controller to control the second radio; and an interface to communicate signaling messages between the first and second controllers, wherein the first controller is to send to the second controller a request to transmit, the request to transmit indicating a request to allow the first radio to transmit over the first wireless network, and wherein the second controller is to assert a transmit-allowed signal over the interface to indicate that the request to transmit is granted, or to de-assert the transmit-allowed signal to indicate that the request to transmit is denied.

20 Claims, 10 Drawing Sheets

APPARATUS, METHOD AND SYSTEM OF CONTROLLING COMMUNICATIONS OF A MULTI-RADIO DEVICE

TECHNICAL FIELD

Embodiments described herein generally relate to multi-radio devices.

BACKGROUND

Some wireless communication devices ("multi-radio devices"), for example, mobile devices, e.g., Smartphones, mobile computers, and the like, may include multiple co-located radios, which may be configured, for example, to communicate according to a plurality of radio technologies.

For example, a multi radio device may include a Bluetooth (BT) radio, a cellular radio, a Wireless Local Area Network (WLAN) radio, and/or any other radio.

Two or more radios of the multi-radio device may communicate over adjacent and/or overlapping wireless communication frequency bands and/or channels. For example, a cellular radio, e.g., a Long-Term Evolution (LTE) radio, may operate in a frequency band, which may be adjacent to a frequency band utilized by a WLAN radio, e.g., a Wireless Fidelity (WiFi) radio, and/or a BT radio. As a result, communications performed by the radios of the multi-radio device may interfere with one another.

The multi-radio device may utilize a coexistence mechanism to mitigate the interference between the radios. For example, the *Bluetooth Specification version* 4.1, *Dec.* 3, 2013, defines a Mobile Wireless Standards (MWS) Coexistence mechanism implemented by co-located BT and MWS devices to control and/or coordinate communications performed by the radios.

Coordinating between communications of a plurality of wireless communication networks may be a complex task, as each wireless communication network may have different requirements and/or may impose different constraints.

As a result, existing coexistence mechanisms are sub-optimal, in the sense that they do not provide optimal utilization of the frequency bands, and may result in degraded performance of one or more of the wireless communication networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
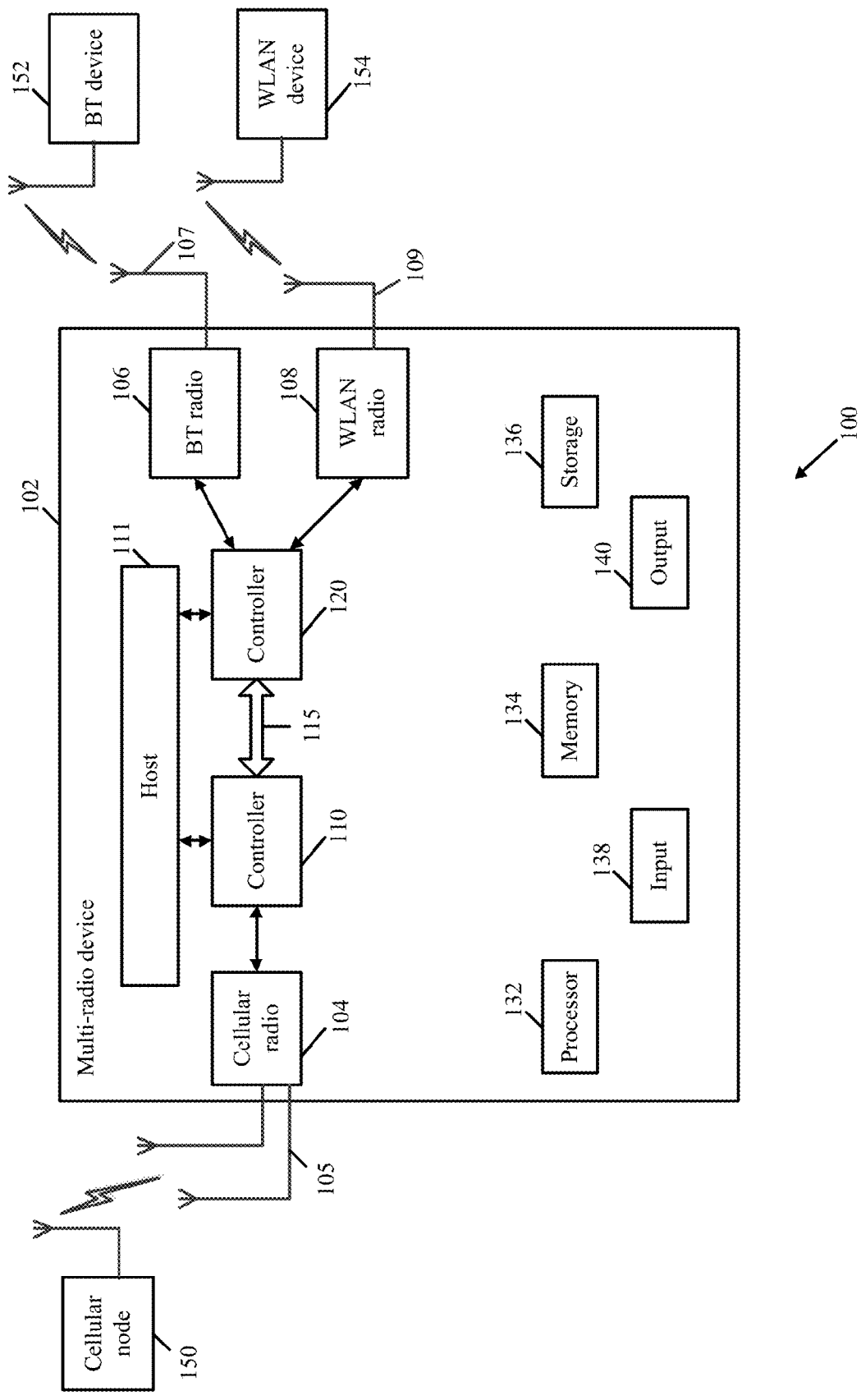
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a multi-radio device, Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, a Bluetooth (BT) device, a Bluetooth Low Energy (BLE) device, an on-board device, an off-board device, a hybrid device, a vehicular device, a non-vehicular device, a mobile or portable device, a Smartphone, a phone device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth Standards"), e.g., including *Bluetooth specification V* 1.0, *Dec.* 1, 1991, *Bluetooth specification V* 4.1, *Dec.* 3, 2013, and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE*802.11*ac*-2013 (*"IEEE P*802.11*ac*-2013, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment 4: Enhancements for Very High Throughput for Operation in Bands below 6 GHz"*, December, 2013); *IEEE* 802.11*ad* (*"IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment 3: Enhancements for Very High Throughput in the* 60 *GHz Band"*, 28 *Dec.* 2012); *IEEE* 802.11 *task group ai (TGai)*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) ("the LTE Standards) (including *ETSI TS* 136 300 *V*11.3.0 (2012-11): *LTE; Evolved Universal Terrestrial Radio Access (E-UTRA) and Evolved Universal Terrestrial Radio Access Network (E-UTRAN); Overall description; Stage* 2 (3*GPP TS* 36.300 *version* 11.3.0 *Release* 11), 2012), and/or future versions and/or derivatives thereof, units and/or devices which are part of the above networks, and the like.

Some embodiments may be used in conjunction with one way and/or two-way radio communication systems, multi-radio devices, cellular radio-telephone communication systems, multi-radio communication systems, Bluetooth communication systems, a User Equipment (UE), a mobile device, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wireless Fidelity (WiFi) network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

Some demonstrative embodiments are described herein with respect to a LTE cellular network. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

In some demonstrative embodiments, system 100 may include a multi-radio device 102 configured to communicate with one or more wireless communication devices of one or more wireless communication networks.

In some demonstrative embodiments, multi-radio device 102 may include a plurality of co-located radios, which may be configured to communicate according to a plurality of radio technologies.

In some demonstrative embodiments, multi-radio device 102 may include a cellular radio 104 configured to communicate with one or more cellular devices, e.g., a cellular node 150 and/or any other cellular device, of a cellular wireless communication network. For example, cellular radio 104 may be configured to communicate with a Global System for Mobile (GSM) network, a Universal Mobile Telecommunications System (UMTS) network, a Long Term Evolution (LTE) network, an LTE-advanced network, a Fifth Generation (5G) network, or any other cellular network.

In some demonstrative embodiments, cellular radio 104 may include a multiple input multiple output (MIMO) transmitters receivers system (not shown), which may be capable of performing antenna beamforming methods. For example, cellular radio 104 may include, for example, a turbo decoder and/or a turbo encoder (not shown) to encode and/or decode data bits into data symbols. In other embodiments, cellular radio 104 may include any other encoder and/or decoder.

In some demonstrative embodiments, cellular radio 104 may include OFDM, OFDMA and/or SC-FDMA modulators and/or demodulators (not shown) configured to communicate OFDM or OFDMA signals over downlink channels, e.g., between cellular node 150 and multi-radio device 102, and/or SC-FDMA signals over uplink channels, e.g., between multi-radio device 102 and cellular node 150. In other embodiments, cellular radio 104 may include any other modulators and/or demodulators.

In some demonstrative embodiments, multi-radio device 102 may include a Bluetooth (BT) radio 106 configured to communicate with at least one BT device 152 of a BT wireless communication network, e.g., according to a secure BT communication protocol, a BLE communication protocol, and/or any other BT communication protocol.

In some demonstrative embodiments, multi-radio device 102 may include a Wireless Local Area Network (WLAN) radio 108 to communicate with a WLAN device 154 of a WLAN. For example, WLAN radio 108 may be configured to communicate with WLAN device 154 over a Wireless Fidelity (WiFi) link, a Point to Point (P2P) link, a WiFi Direct (WFD) link, a Wireless Gigabit (WiGig) link, or any other link.

In some demonstrative embodiments, WLAN radio 108 may be configured to communicate, for example, via a link over the 2.4 Gigahertz (GHz) or 5 GHz frequency band, the 60 GHz frequency band, or any other frequency band.

Some embodiments are described herein with respect to a multi-radio device, e.g., multi-radio device 102, including three radios, e.g., cellular radio 104, BT radio 106 and WLAN radio 108. However, in other embodiments, the multi-radio device may include any other number of radios, e.g., two radios or more than three radios. In one example, the multi-radio device may include two radios, e.g., a cellular radio and a BT radio, a cellular radio and a WLAN radio, and/or any other combination of radios. In another example, the multi-radio device may include more than three radios, e.g., including one or more cellular radios, one or more BT radios, one or more WLAN radios, one or more Mobile Wireless Standards (MWS) radios, and/or any other radios.

In some demonstrative embodiments, multi-radio device 102 may include a controller 110 to control cellular radio 104, and at least one controller 120 to control BT radio 106 and WLAN radio 108, e.g., as described below. In some demonstrative embodiments, controller 110 may include suitable circuitry, e.g., processor circuitry, memory circuitry, Media-Access Control (MAC) circuitry, Physical Layer (PHY) circuitry, and/or any other circuitry, which may be configured to perform at least part of the functionality of controller 110.

Some demonstrative embodiments are described herein with respect to a multi-radio device, e.g., multi-radio device 102, including a controller, e.g., controller 120, configured to control at least two radios, e.g., BT radio 106 and WLAN radio 108. In other embodiments, the multi-radio device may utilize two or more separate controllers to control two or more radios, e.g., two controllers 120 may be utilized to separately control BT radio 106 and WLAN radio 108.

In some demonstrative embodiments, controller 110 may be implemented as part of radio 104, e.g., radio 104 may perform at least part of the functionality of controller 110; and/or controller 120 may be implemented as part of radio 106 and/or radio 108, e.g., radio 106 and/or radio 108 may perform at least part of the functionality of controller 110.

In some demonstrative embodiments, radios 104, 106 and/or 108 may include, for example, one or more wireless transmitters, receivers and/or transceivers able to send and/or receive wireless communication signals, RF signals, frames, blocks, transmission streams, packets, messages, data items, and/or data. In one example, radios 104, 106 and/or 108 may include circuitry, modulation elements, demodulation elements, amplifiers, analog to digital and digital to analog converters, filters, and/or the like.

In some demonstrative embodiments, radios 104, 106 and 108 may include or may be implemented as part of one or more wireless Network Interface Cards (NICs), and the like.

In one example, cellular radio 104, BT radio 106 and WLAN radio 108 may be implemented as part of a single NIC, e.g., capable of providing cellular, BT and WLAN communication functionalities. In another example, cellular radio 104, BT radio 106 and WLAN radio 108 may be implemented by two or more separate NICs.

In some demonstrative embodiments, controller 110 may control cellular radio 104 to communicate between a host application ("host") 111 of multi-radio device 102 and cellular node 150, controller 120 may control BT radio 106 to communicate between host 111 and BT device 152, and/or controller 120 may control WLAN radio 108 to communicate between host 111 and WLAN device 154.

In some demonstrative embodiments, cellular radio 104 may include, or may be associated with, one or more antennas 105, e.g., two or more antennas, BT radio 106 may include, or may be associated with, one or more antennas 107, and/or WLAN radio 108 may include, or may be associated with, one or more antennas 109.

In some demonstrative embodiments, antennas 105, 107 and/or 109 may include any type of antennas suitable for transmitting and/or receiving wireless communication signals, blocks, frames, transmission streams, packets, messages and/or data. For example, antennas 105, 107 and/or 109 may include any suitable configuration, structure and/or arrangement of one or more antenna elements, components, units, assemblies and/or arrays. For example, antennas 105, 107 and/or 107 may include a phased array antenna, a dipole antenna, a single element antenna, a set of switched beam antennas, and/or the like.

In some embodiments, antennas 105, 107 and/or 109 may implement transmit and receive functionalities using separate transmit and receive antenna elements. In some embodiments, antennas 105, 107 and/or 109 may implement transmit and receive functionalities using common and/or integrated transmit/receive elements.

In some demonstrative embodiments, antennas 105, 107 and 109 may utilize one or more separate antenna elements.

In some demonstrative embodiments, antennas 105, 107 and 109 may utilize one or more shared antenna elements.

In some demonstrative embodiments, multi-radio device 102 may include or may be implemented as part a mobile device, for example, a User Equipment (UE), a Mobile Device (MD), a mobile Station (STA), a Subscriber Station (SS), a Mobile Unit (MU), a mobile computer, a laptop computer, an Ultrabook™ computer, a notebook computer, a tablet computer, a handheld computer, a handheld device, a BT device, a BLE device, a cellular device, a cellular phone, a Smartphone, a PDA device, a handheld PDA device, an on-board device, an off-board device, a consumer device, a vehicular device, a non-vehicular device, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a television, a music player, or the like. In other demonstrative embodiments, multi-radio device 102 may include a static or non-portable device, for example, a non-mobile computing device, a desktop computer, a non-portable consumer device, a communication node, a communication station, or the like.

In some demonstrative embodiments, multi-radio device 102 may include, for example, one or more of a processor 132, an input unit 138, an output unit 140, a memory unit 134, and a storage unit 136. Multi-radio device 102 may optionally include other suitable hardware components and/or software components. In some demonstrative embodiments, some or all of the components of multi-radio device 102 may be enclosed in a common housing or packaging, and may be interconnected or operably associated using one or more wired or wireless links. In other embodiments, components of one or more of multi-radio device 102 may be distributed among multiple or separate devices.

Processor 132 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 132 executes instructions, for example, of an Operating System (OS) of multi-radio device 102 and/or of one or more suitable applications.

Input unit 138 includes, for example, a keyboard, a keypad, a mouse, a touch-screen, a touch-pad, a track-ball, a stylus, a microphone, or other suitable pointing device or input device. Output unit 140 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 134 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 136 includes, for example, a hard disk drive, a floppy disk drive, a Compact Disk (CD) drive, a CD-ROM drive, a DVD drive, or other suitable removable or non-removable storage units. Memory unit 134 and/or storage unit 136, for example, may store data processed by multi-radio device 102.

In some demonstrative embodiments, cellular radio 104 may be configured to communicate over one or more cellular frequency bands of a cellular communication network, BT radio 106 may be configured to communicate over one or more BT frequency bands of a BT communication network, and/or WLAN radio 108 may be configured to communicate over one or more WLAN frequency bands of a WLAN.

In some demonstrative embodiments, one or more of the cellular frequency bands may be adjacent to and/or may overlap, partially or entirely, one or more of the BT and/or WLAN frequency bands, e.g., as described below.

In one example, the cellular frequency bands may include a frequency band of 2300-2400 Megahertz (MHz), a frequency band of 2496-2690 MHz, a frequency band of 2500-2570 MHz, a frequency band of 2570-2620 MHz, a frequency band of 2620-2690 MHz, and/or any other frequency band.

In one example, the WLAN frequency bands may include a frequency band of 2400-2500 MHz, and/or any other frequency band.

In one example, the BT frequency bands may include the frequency band of 2400-2483 Mhz, and/or any other frequency band.

In some demonstrative embodiments, radios 104, 106 and/or 108 radios may be configured to communicate according to any other wireless communication technology, and/or over any other frequency bands.

In some demonstrative embodiments, multi-radio device 102 may include any additional or alternative radios configured to communicate according to any other wireless communication technology, and/or over any other frequency bands.

In some demonstrative embodiments, the proximity and/or overlap between the cellular frequency bands, the BT frequency bands and/or the WLAN frequency bands may potentially result in interfere between communications performed by radios 104, 106 and/or 108.

In some demonstrative embodiments, multi-radio device 102 may utilize a coexistence mechanism to control and/or coordinate communications by radios 104, 106 and/or 108.

In some demonstrative embodiments, the coexistence mechanism may include a MWS coexistence mechanism. For example, controller 110 may perform the functionality of a MWS controller, and/or controller 120 may perform the functionality of a BT and/or WLAN (BT/WLAN) controller.

In some demonstrative embodiments, the coexistence mechanism may be configured to control, reduce and/or mitigate interference between communications performed by radios 104, 106 and/or 108, e.g., as described below.

In some demonstrative embodiments, multi-radio device 102 may include an interface 115 to communicate signaling messages between controllers 110 and 120.

In some demonstrative embodiments, the signaling messages may be configured to enable controllers 110 and 120 to exchange information and support cooperative coexistence between radios 104, 106 and 108, e.g., as described below.

In some demonstrative embodiments, the signaling messages may include MWS signaling messages between a MWS controller, e.g., controller 110, and a WLAN/BT controller, e.g., controller 120.

In some demonstrative embodiments, interface 115 may include a real-time transport interface to transport logical signaling messages between controllers 110 and 120.

In some demonstrative embodiments, interface 115 may transfer the signaling messages between radio 104 and radio 106 and/or radio 108m for example, if radio 104 performs at least part of the functionality of controller 110, and/or radio 106 and/or radio 108 perform at least part of the functionality of controller 120.

In one example, radio 106 may include a first controller 120 and radio 108 may include a second controller 120. For example, the first controller 120 and the second controller 120 may be connected via an interface connection, for example, to enable radios 106 and 108 to negotiate and/or coordinate between radios 106 and 108, e.g., one or more of the signaling messages.

In some demonstrative embodiments, interface 115 may include a universal asynchronous receiver/transmitter (UART) interface, e.g., a UART interface including two lines. In other embodiments, interface 115 may include any other type of interface.

In some demonstrative embodiments, controller 110, controller 120 and/or interface 115 may be configured to coordinate between radios 104, 106 and/or 108 in accordance with requirements and/or constraints of the BT Standards, the IEEE 802.11 Standards, the LTE Standards, and/or any other standard, specification and/or protocol.

In some demonstrative embodiments, controller 110 may be configured to coordinate and/or manage a distribution of communication resources between radio 104 and radios 106 and/or 108. For example, controller 120 may request from controller 110 permission for radios 106 and/or 108 to transmit and/or receive, controller 110 may decide whether to grant or deny the request to transmit or receive, and controller 110 may indicate to controller 120 whether the request to transmit and/or receive is granted or denied, e.g., as described below.

In other embodiments, controller 120 may be configured to coordinate and/or manage a distribution of communication resources between radio 104 and radios 106 and/or 108. For example, controller 110 may request from controller 120 permission for radios 106 and/or 108 to transmit and/or receive, controller 120 may decide whether to grant or deny the request to transmit or receive, and controller 120 may indicate to controller 110 whether the request to transmit and/or receive is granted or denied. In other embodiments, the coordination and/or management of the communication resources may be distributed between controllers 110 and 120.

In some demonstrative embodiments, communication by cellular radio 104 over the cellular network may be subject to various constraints defined by the cellular network. For example, cellular radio 104 may be allowed to discard a very small percentage, e.g., less than 10%, of uplink and/or downlink traffic communicated by cellular radio 104. As a result, controller 110 may arbitrate between cellular radio 104 and radios 106 and 108 in a manner, which may be more favorable to communications performed by radio 104, while communications by radios 106 and 108 may be provided with a reduced priority. Accordingly, communication performed by radios 106 and 108 may suffer degraded performance, as result of the preference of the communications performed by cellular radio 104.

In some demonstrative embodiments, controllers 110 and 120 may be configured to communicate over interface 115 signaling messages, which may be configured to enable improved cooperation between controllers 110 and 120, improved resource management of the radio resources distributed between radios 104, 106 and 108, and/or improved decision making by controller 110 with respect to requests from controller 120, e.g., as described below.

In some demonstrative embodiments, controller 120 may be configured to send to controller 110 a request to transmit over interface 115. The request to transmit may indicate to controller 110 a request to allow radio 106 and/or radio 108 to transmit over a wireless network, e.g., a BT network for radio 106, or a WLAN for WLAN radio 108.

In some demonstrative embodiments, controller 120 may be configured to send the request to transmit using a predefined signal over interface 115.

In some demonstrative embodiments, controller 120 may be configured to send the request to transmit using a signal configured to indicate an actual transmission by radio 106 or radio 108. For example, controller 120 may be configured to send the request to transmit using a transmit-on (TX_ON) signal, in a way, which may indicate that a transmission opportunity is requested for transmission by radio 106 and/or radio 108. For example, controller 120 may be configured to send the request to transmit by asserting the transmit-on signal prior to a time for transmitting over the wireless network, e.g., as described below.

In some demonstrative embodiments, controller 120 may be configured to send the request to transmit using a dedicated indication signal, for example, a dedicated transmit request signal, e.g., as described below.

In some demonstrative embodiments, controller 110 may be configured to receive the request to transmit and to decide whether to grant or deny the request to transmit, for example, based on whether or not cellular radio 104 is engaged in, or scheduled to be engaged in, uplink (UL) communication of UL traffic to cellular node 150, whether or not cellular radio 104 is engaged in, or scheduled to be engaged in, downlink (DL) communication of DL traffic from cellular node 150; based on one or more attributes of communication by cellular radio 104, for example, a transmission power, a transmission quality, e.g., a Signal to Noise Ratio (SNR), a frequency channel of the transmission, and the like; based on one or more attributes of communication by radios 106 and/or 108, for example, a transmission power, a transmission quality, e.g., a Signal to Noise Ratio (SNR), a frequency channel of the transmission, and the like; and/or based on any other criteria, e.g., as described below.

In some demonstrative embodiments, controller 110 may be configured to send to controller 120 an indication to indicate whether or not the request to transmit is granted or denied.

In some demonstrative embodiments, controller 110 may be configured to assert a transmit-allowed signal over interface 115, e.g., to indicate that the request to transmit is granted, or to de-assert the transmit-allowed signal, e.g., to indicate that the request to transmit is denied.

In some demonstrative embodiments, controller 110 may be configured to indicate to controller 120 whether the transmit-allowed signal is to grant transmission permission to BT radio 106 or to grant transmission permission to WLAN 108. For example, controller 110 may decide to grant a request to transmit by BT radio 106, and to deny a request to transmit by WLAN radio 108; or controller 110 may decide to deny a request to transmit by BT radio 106, and to grant a request to transmit by WLAN radio 108.

In some demonstrative embodiments, controller 110 may use two different types of signals, e.g., configured to separately and/or independently respond to transmit requests from BT radio 106 and WLAN radio 108.

In some demonstrative embodiments, controller 110 may send a first transmit-allowed signal, e.g., a MWS_BT_TX_ALLOWED signal, to indicate if a request to transmit over the BT wireless network is granted to radio 106, and a second transmit-allowed signal, e.g., a MWS-WIFI_TX_ALLOWED signal, to indicate if a request to transmit over the WLAN wireless network is granted to radio 108.

In some demonstrative embodiments, the ability to differentiate between the indication of a grant/deny decision corresponding to a request to transmit pertaining to BT radio 106, and the indication of a grant/deny decision corresponding to a request to transmit pertaining to WLAN radio 108, may enable controller 120 to control communications by radios 106 and 108 in a separate and/or independent manner, which may improve performance over the BT and/or WLAN networks.

In some demonstrative embodiments, WLAN transmission by WLAN radio 108 may be asynchronous, for example, WLAN radio 108 may be configured to transmit WLAN transmissions based on detection of a free wireless communication medium, e.g., using a Clear Channel Assessment (CCA) mechanism, and the like. Additionally, some transmissions, e.g., transmission of an Acknowledgement (ACK), may be performed by WLAN radio 108 substantially immediately, e.g., without prior scheduling, knowledge and/or notice. Accordingly, it may be difficult to predict and/or guarantee an exact transmission time of transmissions performed by WLAN radio 108.

In some demonstrative embodiments, the transmit requests from controller 120 pertaining to WLAN radio 108 may not accurately reflect actual transmissions performed by radio 108. For example, controller 120 may send to controller 110 a transmit request to request permission for a transmission by WLAN radio 108, and controller 110 may grant the transmit request, but WLAN radio 110 may eventually not perform an actual transmission, e.g., if the WLAN medium is detected to be busy.

In some demonstrative embodiments, it may be advantageous to enable controller 110 to monitor and/or maintain a record of transmissions actually performed by radio 108. For example, controller 110 may be able to determine a percentage of transmit requests, which are granted but not used by WLAN radio 108 and/or any other metric, e.g., which may be used to improve an efficiency of granting or denying further transmit requests pertaining to WLAN radio 108.

In some demonstrative embodiments, controller 120 may be configured to provide an indication ("transmit indication") over interface 115 to indicate to controller 110 an actual transmission by radio 108 over the WLAN, e.g., in real time.

In some demonstrative embodiments, controller 120 may provide to controller 110 the transit indication in addition to the request to transmit, e.g., to enable controller 110 to differentiate between requests to transmit and actual transmissions performed by WLAN radio 108.

In some demonstrative embodiments, controller 120 may assert a transmit indication over interface 115, e.g., a WIFI_TX_ON_INDICATION or an 802_TX_ON_INDICATION as described below, to indicate the actual transmission by radio 108.

In some demonstrative embodiments, controller 120 may use the same signaling message to provide to controller 110 the request to transmit and the transmit indication, e.g., as described below.

In some demonstrative embodiments, the transmit indication and the request to transmit may be sent as part of a transmit-on signal, e.g., an 802_TX_ON signal. For example, a flag bit may be set to indicate whether the 802_TX_ON signal is to indicate a request to transmit or a transmit indication, e.g., as described below.

In some demonstrative embodiments, controller 120 may be configured to send the request to transmit by asserting a first signaling bit and setting a second signaling bit to a first value indicating that the first signaling bit includes the request to transmit; and to assert the transmit indication by asserting the first signaling bit and setting the second signaling bit to a second value indicating that the first signaling bit includes the transmit indication.

In one example, the first signaling bit may include a Transmit On (TX_ON) signaling bit, e.g., as described below.

In some demonstrative embodiments, controller 120 may use a first signaling message to provide the request to transmit to controller 110, and a second, different, signaling message, to provide the transmit indication to controller 110.

In one example, controller 120 may assert the 802_TX_ON signal to provide the transmit indication of actual transmission by WLAN radio 108, and controller 120 may assert an 802_TX_Indication signal to indicate the request to transmit.

In another example, controller 120 may assert the 802_TX_ON signal to indicate the request to transmit, and controller 120 may assert an 802_TX_Indication signal to provide the transmit indication of actual transmission by WLAN radio 108.

In other embodiments, one or more other signals may be used to provide the transmit indication and/or the request to transmit.

In some demonstrative embodiments, the separate signaling of the request to transmit indication may enable controller 110 to differentiate between requests for permission to perform WLAN transmissions, and actual WLAN transmissions. This differentiation may enable controller 110 to better coordinate the communications of cellular radio 104 and WLAN radio 108. For example, controller 110 may control cellular radio 104 to perform communication, e.g., DL communication, even after granting a request to transmit to WLAN radio 108, for example, at least until receiving the indication of actual transmission by WLAN radio 108. Accordingly, cellular radio 104 may be able to use communication resources, which otherwise may have been wasted, e.g., if cellular radio 104 was to avoid communications when a request to transmit is granted, but not used by WLAN radio 108.

In some demonstrative embodiments, controller 120 may be configured to send to controller 110 information (Tx information) corresponding to a requested transmission, for example, information related to a transmission power and/or transmission frequency to be used for the requested transmission, e.g., as described below. The Tx information may be included as part of request to transmit, or may be sent in a separate signaling message. According to these embodiments, controller 110 may consider the Tx information, when deciding whether to grant or deny the request to transmit.

In some demonstrative embodiments, controller 120 may send to controller 110 a BT channel signal, e.g., a BT_TX_CH signal, to indicate a planed BT channel to be used for a transmission by BT radio 106. In one example, controller 120 may send the BT_TX_CH signal prior to sending a BT request to transmit, e.g., a BT transmit ON (BT_TX_ON) signal. According to this example, the BT_TX_CH may indicate a planned BT channel to be used for the requested transmission by BT radio 106.

In one example, controller 120 may send the BT channel signal as part of a first message, e.g., an MSG6 message as described below, prior to sending a second message, e.g., a MSG0 message as described below, including the BT request to transmit.

In some demonstrative embodiments, the BT channel signal may include 5 bits representing the planned BT channel.

In one example, the BT channel signal may include the five Most Significant Bits (MSBs) representing the planned BT channel, e.g., as follows:

TABLE 1

| Channel index | lower bound | upper bound |
|---|---|---|
| 0 | 2402 | 2405 |
| 1 | 2406 | 2409 |
| 2 | 2410 | 2413 |
| 3 | 2414 | 2417 |
| 4 | 2418 | 2421 |
| 5 | 2422 | 2425 |
| 6 | 2426 | 2429 |
| 7 | 2430 | 2433 |
| 8 | 2434 | 2437 |
| 9 | 2438 | 2441 |
| 10 | 2442 | 2445 |
| 11 | 2446 | 2449 |
| 12 | 2450 | 2453 |
| 13 | 2454 | 2457 |
| 14 | 2458 | 2461 |
| 15 | 2462 | 2465 |
| 16 | 2466 | 2469 |
| 17 | 2470 | 2473 |
| 18 | 2474 | 2477 |
| 19 | 2478 | 2481 |

In other embodiments, the BT channel signal may include any other information representing the planned BT channel.

In some demonstrative embodiments, controller 120 may send to controller 110 a BT transmit power signal, e.g., a BT_TX_POWER signal, to indicate a planned BT transmission power to be used for a transmission by BT radio 106. In one example, controller 120 may send the BT_TX_POWER signal prior to sending a BT request to transmit, e.g., a BT transmit ON (BT_TX_ON) signal. According to this example, the BT_TX_POWER may indicate a planed transmit power to be used for the requested transmission by BT radio 106.

In one example, controller 120 may send the BT transmit power signal as part of a first message, e.g., an MSG7 message as described below, prior to sending a second message, e.g., the MSG0 message as described below, including the BT request to transmit.

In some demonstrative embodiments, controller 120 may use the BT channel information and/or the BT transmit power information, e.g., when deciding whether or not to grant the BT transmit request. For example, controller 120 may use the BT channel information and/or the BT transmit power information to determine an expected impact of the BT transmission on a communication to be performed by cellular radio 104, e.g., a DL communication to be received by cellular radio 104, during the BT transmission. For example, a higher BT transmission power may have a higher impact on the communication by cellular radio 104, and/or a shorter distance between the planned BT channel and a channel used by cellular radio 104 may result in a higher impact on the communication by cellular radio 104. Controller 120 may determine whether to grant or deny the BT request to transmit, for example, while taking into consideration the expected impact of the BT transmission on the communication by cellular radio 104.

In some demonstrative embodiments, controller 120 may be configured to send to controller 110 a request to receive over interface 115. The request to receive may indicate to controller 110 a request to allow radio 106 and/or radio 108 to receive a communication over a wireless network, e.g., a BT network for radio 106, or a WLAN for WLAN radio 108.

In some demonstrative embodiments, controller 120 may be configured to send the request to receive using a predefined signal over interface 115. For example, controller 120 may send a BT request to receive, e.g., a BT_RX-PRI signal as described below, to indicate a request to receive a communication at BT radio 106, and a WLAN request to receive, e.g., an 802_RX-PRI signal as described below, to indicate a request to receive a communication at WLAN radio 108.

In some demonstrative embodiments, controller 110 may be configured to select between granting the request to receive and denying the request to receive, for example, based on whether or not cellular radio 104 is engaged in, or scheduled to be engaged in, uplink (UL) communication of UL traffic to cellular node 150, whether or not cellular radio 104 is engaged in, or scheduled to be engaged in, downlink (DL) communication of DL traffic from cellular node 150; based on one or more attributes of communication by cellular radio 104, for example, a transmission power, a transmission quality, e.g., a Signal to Noise Ratio (SNR), a frequency channel of the transmission, and the like; based on one or more attributes of communication by radios 106 and/or 108, for example, a transmission power, a transmission quality, e.g., a Signal to Noise Ratio (SNR), a frequency channel of the transmission, and the like; and/or based on any other criteria.

In some demonstrative embodiments, controller 110 may be configured to inform controller 120 of a time period, during which cellular radio 104 is not to transmit over the cellular network, for example, if controller 110 decides to grant the request to transmit.

In some demonstrative embodiments, controller 110 may send over interface 110 a transmit-off signal, e.g., a MWS_TX_OFF signal, to indicate a time period, during which radio 104 is not to transmit UL transmissions over the cellular network.

In some demonstrative embodiments, controller 110 may be configured to terminate ("kill") an UL transmission performed by cellular radio 104 over the cellular network, for example, when controller 110 selects to grant the request to receive, e.g., if the request to receive pertains to receiving a communication during the UL transmission.

In some demonstrative embodiments, controller 110 may use a transmit indication signal, e.g., a MWS_TX signal, to indicate actual transmission performed by cellular radio 104. Controller 110 may be configured to assert or de-assert that transmit indication signal at a predefined timing, for example, a predefined offset time, e.g., 150 microseconds (usec), prior to an actual beginning or end of the transmission performed by cellular radio 104. Accordingly, MWS_TX signal may not enable conveying to controller 120 an immediate, e.g., real-time, indication of a termination ("kill") of a transmission performed by cellular radio 104.

In some demonstrative embodiments, the transmit-off signal may be implemented by controller 110 to provide a real time, e.g., immediate, indication to controller 120 of whether or not an actual transmission is being performed by cellular radio 104.

In some demonstrative embodiments, controller 120 may determine that cellular radio 104 is actually performing an UL transmission, for example, if the MWS_TX signal is asserted and the transmit-off signal is de-asserted.

In some demonstrative embodiments, controller 120 may determine the request to receive has been granted, and that a quiet time may be guaranteed for reception by radios 106 and/or 108, for example, when the transmit-off signal is asserted.

In some demonstrative embodiments, controller 110 may send the transmit-off signal, for example, while the transmit indication signal is still asserted, for example, prior to de-asserting the transmit indication signal, e.g., since the transmit indication may be de-asserted after the offset time following the actual end of the transmission by cellular radio 104.

In some demonstrative embodiments, the ability to assert the transmit-off signal immediately upon terminating the UL transmission by cellular radio 104, may enable controller 110 to receive the request to receive from controller 120 during a sub-frame period of the cellular network, and to send the transmit-off signal during the same sub-frame, for example, in opposed to the MWS-TX signal, which may be de-asserted after the sub-frame, e.g., due to the predefined offset time, e.g., as described below.

In some demonstrative embodiments, the transmit-off signal may enable improved processing of communications performed by radios 106 and/or 108.

In one example, the knowledge that the request to receive has been granted and that cellular radio 104 is not to perform UL transmission, may enable to determine whether a failed reception at radios 106 and/or 108 is due to UL activity at cellular radio 104, e.g., if the transmit-off signal is de-asserted, or due to medium interference over the BT/WLAN, e.g., if the transmit-off signal is de-asserted.

In another example, the knowledge that the request to receive has been granted and that cellular radio 104 is not to perform UL transmission, may be used by one or more processing algorithms corresponding to communications by radios 106 and/or 108, for example, WiFi channel tracking algorithms, and the like.

In some demonstrative embodiments, a request, e.g., the request to transmit and/or the request to receive, which is sent from controller 120 to controller 110 over interface 115, may be configured to include a priority indication to differentiate between at least two priority levels of the request. In one example, the request may include a priority indication to indicate whether the request has a first priority, or a second priority, higher than the first priority. In another example, the priority indication may indicate a priority level selected from more than two priorities.

In some demonstrative embodiments, the request to transmit may include a priority indication, e.g., in the form of a priority bit, to indicate whether the request to transmit has a first priority, or a second priority, higher than the first priority.

In some demonstrative embodiments, the request to receive may include a priority indication, e.g., in the form of a priority bit, to indicate whether the request to receive has a first priority, or a second priority, higher than the first priority.

In some demonstrative embodiments, controller 110 may decide whether to grant the request to transmit, for example, by taking into consideration the priority indication. For example, controller 110 may select to grant a first request to transmit having the second priority, and to select to deny a second request to transmit having the first priority level.

In some demonstrative embodiments, controller 110 may decide whether to grant the request to receive, for example, by taking into consideration the priority indication. For example, controller 110 may select to grant a first request to receive having the second priority, and to select to deny a second request to receive having the first priority level.

In some demonstrative embodiments, a priority level of the request may be defined using a combination of two predefined priority indications, e.g., a TX/RX priority, and a connection priority.

In one example, a BT_RX_PRI bit may be used to indicate a BT request to receive at a normal priority, and a CONNECTION-PRI bit may be used to indicate whether the request should have a high priority.

In another example, an 802_RX_PRI bit may be used to indicate a WLAN request to receive at a normal priority, and a CONNECTION-PRI bit may be used to indicate whether the request should have a high priority.

For example, a priority level may be assigned to a request to transmit or a request to receive, e.g., according to the following table:

TABLE 2

| Tx/Rx Priority | Connection Priority | Request priority level |
| --- | --- | --- |
| 0 | 0 | No request |
| 0 | 1 | No request |
| 1 | 0 | Normal priority request |
| 1 | 1 | High priority request |

In some demonstrative embodiments, controller 120 may assign a normal priority, e.g., by setting only the TX/RX priority, to one or more transmit or receive requests corresponding to one or more predefined types of communications to be communicated by WLAN radio 108. For example, controller 120 may send to controller 110 a transmit request with the normal priority, in order to request permission for WLAN radio 108 to transmit an ACK for a long received WLAN packet; to transmit a frame with a predefined Access Category (AC), e.g., a frame of a Voice (VO) AC (AC_VO); to transmit a block acknowledgement (BlockAck); to transmit a Request to Send (RTS); to transmit an ACK; to transmit an Action frame; and/or to transmit any other predefined type of date, control and/or management frame.

In some demonstrative embodiments, controller 120 may assign a high priority, e.g., by setting both the TX/RX priority and the connection priority, to one or more transmit requests or receive requests corresponding to one or more other predefined types of communications to be communicated by WLAN radio 108. For example, controller 120 may send to controller 110 a transmit request with the high priority, in order to request permission for WLAN radio 108 to transmit an Association request frame; to transmit an Association Response frame; to transmit a Re-association Request frame; to transmit a Re-association response frame; to transmit a Disassociation frame; to transmit an Authentication frame; to transmit a De-authentication frame; to transmit a Probe Request, e.g., a Scan frame or a Search for P2P device frame; to transmit a Probe Response, e.g., a Group Owner (GO) probe response, or a Listen frame for a P2P device; to transmit a Beacon frame; to transmit a delivery traffic indication message (DTIM); to transmit a Calibration frame; and/or to transmit any other predefined type of date, control and/or management frame.

In some demonstrative embodiments, controller 120 may assign a high priority, e.g., by setting both the TX/RX priority and the connection priority, to one or more transmit requests and/or receive requests corresponding to one or more other predefined types of communications to be communicated by BT radio 106. For example, controller 120 may send to controller 110 a transmit request or a receive request with the high priority, in order to request permission for BT radio 106 to communicate during a BT connection establishment procedure; to communicate a BT Hands-Free Profile (HFP) message, e.g., to transmit over a Synchronous Connection Oriented (SCO) link or an Enhanced SCO (eSCO) link; to communicate according to an Advanced Audio Distribution Profiled (A2DP), e.g., at a first or second retry after initial failure; to communicate during a Role Switch; to communicate during a Piconet Adjustment; and/or to communicate any other predefined type of date, control and/or management messages.

In some demonstrative embodiments, controller 110 may be configured to assert a downlink synchronization signal, e.g., from controller 110 to controller 120, to indicate a timing of a downlink subframe, e.g., a Time-Division-Duplexing (TDD) downlink subframe or any other downlink subframe, over the second wireless network, e.g., as described below.

In some demonstrative embodiments, the timing of a DL subframe and an UL subframe may not be aligned, for example, in a TDD-based communication scheme, e.g., a TDD LTE scheme, or any other scheme, for example, due to propagation time of traffic, e.g., LTE traffic, between a base station and a UE.

In some demonstrative embodiments, controller 120 may use the indication of the timing of the DL subframe, for example, in order to improve and/or optimize tracking of the activity of radio 104. In one example, downlink synchronization signal may be configured to enable controller 120 to differentiate between the timings of the DL and UL subframes.

In some demonstrative embodiments, controller 110 may assert the downlink synchronization signal to indicate a timing of a predefined subframe. In one example, controller 110 may assert the downlink synchronization signal to indicate a timing of a subframe number zero (subframe #0) of an LTE subframe scheme, for example, since subframe#0 is a defined as a DL subframe.

In some demonstrative embodiments, controller 110 may assert the downlink synchronization signal a predefined time period, e.g., 150 usec, prior to beginning of the predefined subframe, and may de-assert the downlink synchronization signal a predefined time period, e.g., 150 usec, prior to an end of the predefined subframe. For example, controller 110 may assert the downlink synchronization signal in a subframe, e.g., a subframe number 9 (subframe #9), preceding the subframe#0, 150 usec prior to the end of subframe#9, and may de-assert the downlink synchronization signal 150 usec prior to an end of the subframe#0.

In some demonstrative embodiments, controller 110, controller 120 and/or interface 115 may be configured to communicate a BT transmit allowed signal, denoted MWS_BT_TX_ALLOWED, to indicate whether or not controller 110 permits BT radio 106 to transmit.

In some demonstrative embodiments, controller 110, controller 120 and/or interface 115 may be configured to communicate a WLAN transmit allowed signal, denoted MWS_WIFI_TX_ALLOWED, to indicate whether or not controller 110 permits WLAN radio 108 to transmit.

In some demonstrative embodiments, controller 110, controller 120 and/or interface 115 may be configured to communicate a transmit-off signal, denoted MWS_TX_OFF, to indicate whether cellular radio 104 is not transmitting.

In some demonstrative embodiments, controller 110, controller 120 and/or interface 115 may be configured to communicate a transmit indication signal, denoted 802_TX_ON_IND, to indicate a transmission being transmitted by WLAN radio 108.

In some demonstrative embodiments, controller 110, controller 120 and/or interface 115 may be configured to communicate a transmit request signal, denoted 802_TX_ON, to indicate a transmit request for permission to transmit from WLAN radio 108.

In some demonstrative embodiments, controller 110, controller 120 and/or interface 115 may be configured to communicate a transmit request signal, denoted BT_TX_ON, to indicate a transmit request for permission to transmit from BT radio 106.

In some demonstrative embodiments, controller 110, controller 120 and/or interface 115 may be configured to communicate a BT channel signal, denoted BT_TX_CHANNEL, to indicate a BT channel to be used for transmission by BT radio 106.

In some demonstrative embodiments, controller 110, controller 120 and/or interface 115 may be configured to communicate a BT receive priority signal, denoted BT_RX_PRI, to indicate a priority of a request to receive via BT radio 106.

In some demonstrative embodiments, controller 110, controller 120 and/or interface 115 may be configured to communicate a WLAN receive priority signal, denoted 802_RX_PRI, to indicate a priority of a request to receive via WLAN radio 108.

In some demonstrative embodiments, controller 110, controller 120 and/or interface 115 may be configured to communicate a downlink synchronization signal, denoted FRAME_SYNC_DL, to indicate a timing of a downlink subframe over the second wireless network.

In some demonstrative embodiments, the signal 802_TX_ON_IND may be sent from controller 120 to controller 110 via interface 115.

In some demonstrative embodiments, controller 120 may assert or de-asset the signal 802_TX_ON_IND, e.g., immediately, according to an actual transmission performed by WLAN radio 108, e.g., regardless of a transmit output power of the transmission.

In some demonstrative embodiments, the signal 802_TX_ON may be sent from controller 120 to controller 110 via interface 115.

In some demonstrative embodiments, controller 120 may assert the signal 802_TX_ON_IND, e.g., immediately, to indicate a transmission request for WLAN radio 108.

In some demonstrative embodiments, the signal BT_TX_ON may be sent from controller 120 to controller 110 via interface 115.

In some demonstrative embodiments, controller 120 may assert the signal BT_TX_ON, e.g., immediately, to indicate a transmission for BT radio 106.

In some demonstrative embodiments, controller 120 may send a BT_TX_CH signal to indicate a transmit channel to be used by BT radio 106, and/or a BT_TX_POWER signal to indicate a transmit output power of BT radio 160, e.g., as described above.

In some demonstrative embodiments, the signals MWS_BT_TX_ALLOWED and MWS_WIFI_TX_ALLOWED may be sent from controller 110 to controller 120 via interface 115.

In some demonstrative embodiments, controller 110 may assert the signal MWS_BT_TX_ALLOWED immediately or no more than a predefined offset time, e.g., 150 usec, after receiving a BT_TX_ON signal from controller 120; and/or controller 110 may assert the signal MWS_WIFI_TX_ALLOWED immediately or no more than a predefined offset time, e.g., 150 usec, after receiving a 802_TX_ON signal from controller 120.

In some demonstrative embodiments, controller 110 may de-assert the signal MWS_BT_TX_ALLOWED immediately or at a DL event anchor, for example, a predefined offset time, e.g., 150 usec, before a DL sub-frame boundary; and/or controller 110 may de-assert the signal MWS_WIFI_TX_ALLOWED immediately or at a DL event anchor, for example, a predefined offset time, e.g., 150 usec, before a DL sub-frame boundary;

In some demonstrative embodiments, controller 110 may assert the MWS_WIFI_TX_ALLOWED signal and/or the MWS_BT_TX_ALLOWED signal to indicate that cellular radio 104 allows radio 108 and/or radio 106, respectively, to transmit, e.g., although there may be a DL subframe being received by cellular radio 104 during the transmission.

In some demonstrative embodiments, controller 110 may assert or de-assert the signals MWS_WIFI_TX_ALLOWED and/or MWS_BT_TX_ALLOWED to indicate a response to the 802_TX_ON and/or BT_TX_ON transmit requests, respectively.

For example, controller 110 may de-assert the signal MWS_WIFI_TX_ALLOWED, e.g., to the value "0", when a WLAN request to transmit is denied, and/or controller 110 may de-assert the signal MWS_BT_TX_ALLOWED, e.g., to the value "0", when a BT request to transmit is denied.

For example, controller 110 may assert the signal MWS_WIFI_TX_ALLOWED, e.g., to the value "1", when the WLAN request to transmit is granted, and/or controller 110 may assert the signal MWS_BT_TX_ALLOWED, e.g., to the value "1, when the BT request to transmit is granted.

In some demonstrative embodiments, controller 110 may set the signals MWS_WIFI_TX_ALLOWED and/or MWS_BT_TX_ALLOWED to indicate WLAN radio 108 and/or BT radio 106, respectively, are allowed to transmit, for example, upon receiving from controller 120 the 802_TX_ON and/or BT_TX_ON transmit requests, e.g., during an UL subframe, e.g., as described below.

In some demonstrative embodiments, the signal FRAME_SYNC_DL may be sent from controller 110 to controller 120 via interface 115.

In some demonstrative embodiments, controller 110 may assert the signal FRAME_SYNC_DL 150 usec prior to the beginning of subframe#0, and de-assert the signal FRAME_SYNC_DL 150 usec prior to the end of subframe#0.

In some demonstrative embodiments, controller 110, controller 120 and/or interface 115 may be configured to communicate the signals described above using a plurality of predefined signaling messages, e.g., as described below.

In some demonstrative embodiments, a signaling message, denoted MSG0, may be sent from controller 110 to controller 120. When sent from controller 110 to controller 120, the message MSG0 may include a bit representing an indication signal, denoted MWS_RX, to indicate reception of signals by cellular radio 104; and a bit representing an indication signal, denoted MWS_TX, to indicate transmission of signals by cellular radio 104.

In some demonstrative embodiments, the message MSG0 may be sent from controller 120 to controller 110. When sent from controller 120 to controller 110, the message MSG0 may include a bit representing the signal BT_RX_PRI, a bit representing the signal BT_TX_ON, a bit representing the signal 802_RX_PRI, a bit representing the signal 802_TX_ON, and a bit representing the signal CONNECTION_PRI to indicate whether or not a request to transmit or a request to receive is assigned the connection priority.

In some demonstrative embodiments, a signaling message, denoted MSG6, e.g., vendor specific message type 6, may be sent from controller 120 to controller 110. When sent from controller 120 to controller 110, the message MSG6 may include five bits representing the signal BT_TX_CH, e.g., as described above.

In some demonstrative embodiments, the message MSG6 may be sent from controller 110 to controller 120. When sent from controller 110 to controller 120, the message MSG6 may include a bit, e.g., the fifth bit of MSG6, representing the signal FRAME_SYNC_DL, e.g., as described above. In one example, controller 110 may send the MSG0, e.g., 150 usec prior to subframe#0, followed by the MSG6 including the bit of signal FRAME_SYNC_DL being set.

In some demonstrative embodiments, a signaling message, denoted MSG7, e.g., a vendor specific message type 7, may be sent from controller 110 to controller 120. When sent from controller 110 to controller 120, the message MSG7 may include a bit representing the signal MWS_WIFI_TX_ALLOWED, and a bit representing the signal MWS_BT_TX_ALLOWED.

In some demonstrative embodiments, the message MSG7 may be sent from controller 120 to controller 110. When sent from controller 120 to controller 110, the message MSG7 may include a bit representing an indication signal From_BT_802, having a first value, e.g., "0", to indicate that information in the message MSG7 corresponds to BT radio 106, or a second value, e.g., "1", to indicate that information in the message MSG7 corresponds to WLAN radio 108.

In one example, the signal From_BT_802 may have the bit value "0", and the message MSG7 may include four bits representing the signal BT_TX_POWER, e.g., as described above.

In another example, the signal From_BT_802 may have the bit value "1", and the message MSG7 may include a bit representing the signal 802_TX_ON_IND.

Figure 2:
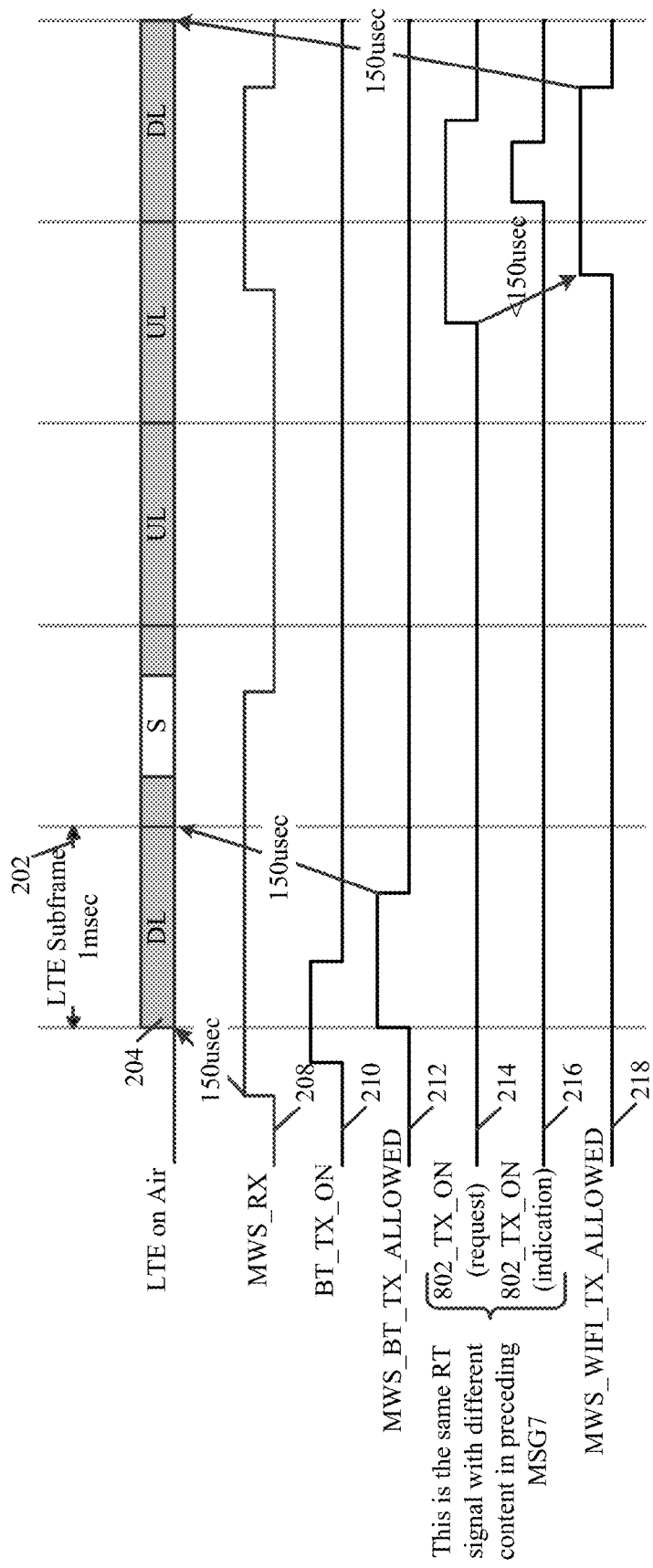
FIG. 2 is a schematic signaling diagram illustration demonstrating a signaling scheme between controllers of a multi-radio device, in accordance with some demonstrative embodiments.

Reference is made to FIG. 2, which includes a signaling diagram illustration demonstrating a signaling scheme between controllers of a multi-radio device, in accordance with some demonstrative embodiments. In some demonstrative embodiments, the signaling scheme of FIG. 2 may be implemented by controllers 110 and 120 (FIG. 1).

In some demonstrative embodiments, cellular radio 104 (FIG. 1) may communicate over the cellular network according to a sequence of LTE subframes 202, e.g., having a duration of 1 millisecond (msec).

In some demonstrative embodiments, controller 110 (FIG. 1) may assert a MWS_RX signal 208 an offset time of 150 usec prior to the beginning of a DL transmission 204 received at cellular radio 104 (FIG. 1).

In some demonstrative embodiments, controller 120 (FIG. 1) may assert a BT_TX_ON signal 210 to indicate a transmit request for permission to transmit from BT radio 106 (FIG. 1). As shown in FIG. 2, controller 120 (FIG. 1) may assert the BT_TX_ON signal 210 prior to an intended time of the BT transmission to be performed by BT radio 106 (FIG. 1).

In some demonstrative embodiments, controller 110 (FIG. 1) may decide to grant the transmit request, and may assert a MWS_BT_TX_ALLOWED signal 212, e.g., no more than 150 usec after the signal BT_TX_ON 210 is asserted.

In some demonstrative embodiments, controller 120 (FIG. 1) may assert an 802_TX_ON request signal 214 to indicate a transmit request for permission to transmit from WLAN radio 108 (FIG. 1). As shown in FIG. 2, controller 120 (FIG. 1) may assert the 802_TX_ON request signal 214 prior to an intended time of the WLAN transmission to be performed by WLAN radio 108 (FIG. 1).

In some demonstrative embodiments, controller 110 (FIG. 1) may decide to grant the transmit request, and may assert a MWS_WIFI_TX_ALLOWED signal 218, e.g., no more than 150 usec after the 802_TX_ON request signal 214 is asserted. As shown in FIG. 2, controller 110 (FIG. 1) may de-assert the MWS_WIFI_TX_ALLOWED signal 218, e.g., 150 usec prior to a DL sub-frame boundary.

In some demonstrative embodiments, controller 120 (FIG. 1) may assert an 802_TX_ON indication signal 216 to indicate actual transmission being performed by WLAN radio 108 (FIG. 1).

Figure 3:
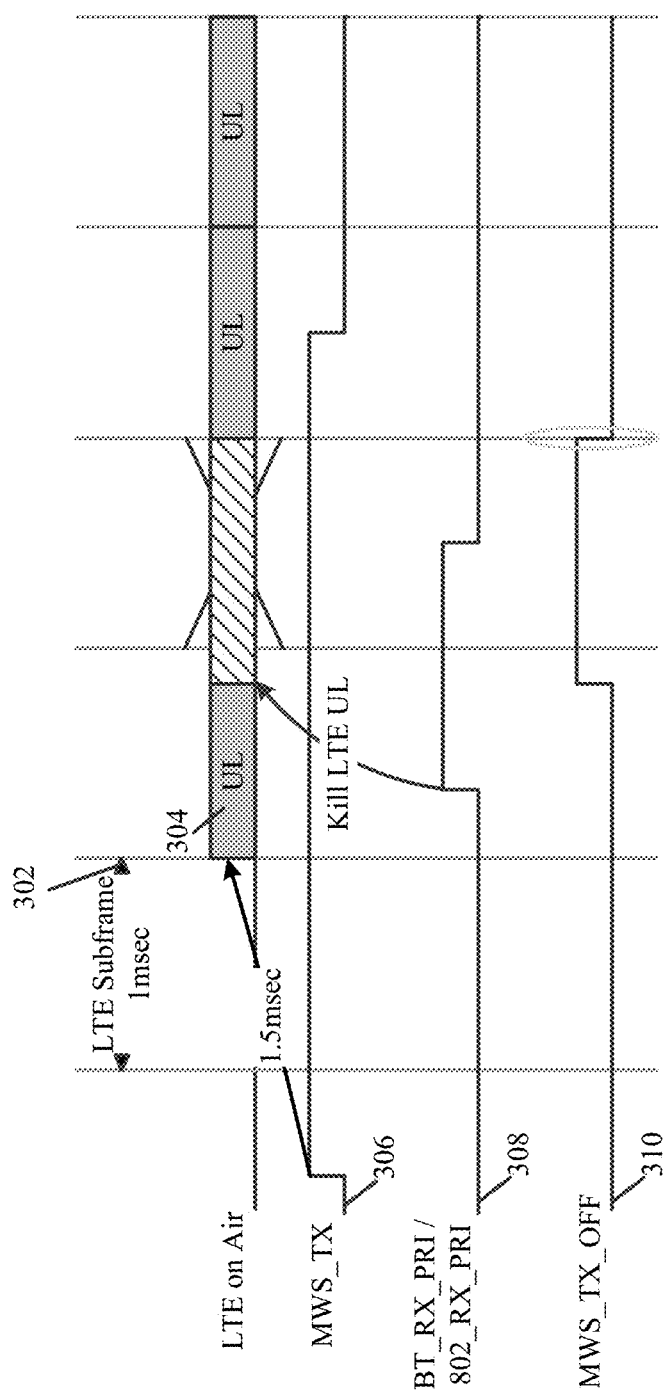
FIG. 3 is a schematic signaling diagram illustration demonstrating another signaling scheme between controllers of a multi-radio device, in accordance with some demonstrative embodiments.

Reference is made to FIG. 3, which includes a signaling diagram illustration demonstrating a signaling scheme between controllers of a multi-radio device, in accordance with some demonstrative embodiments. In some demonstrative embodiments, the signaling scheme of FIG. 3 may be implemented by controllers 110 and 120 (FIG. 1).

In some demonstrative embodiments, cellular radio 104 (FIG. 1) may communicate over the cellular network according to a sequence of LTE subframes 302, e.g., having a duration of 1 msec.

In some demonstrative embodiments, controller 110 (FIG. 1) may assert a MWS_TX signal 306 an offset time of 150 usec prior to the beginning of an UL transmission from cellular radio 104 (FIG. 1).

In some demonstrative embodiments, controller 120 (FIG. 1) may assert a receive request signal 308, e.g., a BT_RX_PRI signal or an 802_RX_PRI signal, to indicate a request to receive a transmission at BT radio 106 (FIG. 1) or WLAN radio 108 (FIG. 1).

In some demonstrative embodiments, controller 110 (FIG. 1) may decide to terminate ("kill") the UL transmission 304, e.g., based on the receive request signal 308.

In some demonstrative embodiments, controller 110 (FIG. 1) may assert a MWSTX_OFF signal 310 to indicate to controller 120 (FIG. 1) that the request to receive is granted, and that cellular radio 104 (FIG. 1) is not to perform a transmission.

As shown in FIG. 3, the MWSTX_OFF signal 310 may be asserted within a very short time period, from the assertion of the receive request signal 308. Accordingly, as shown in FIG. 3, the MWSTX_OFF signal 310 may be asserted within the same sub-frame, in which the request to receive 308 is asserted. As shown in FIG. 3, the MWSTX_OFF signal 310 may be asserted prior to de-assertion of the signal MWS_TX, which may be asserted after the offset time, e.g., of 150 usec.

Figure 4:
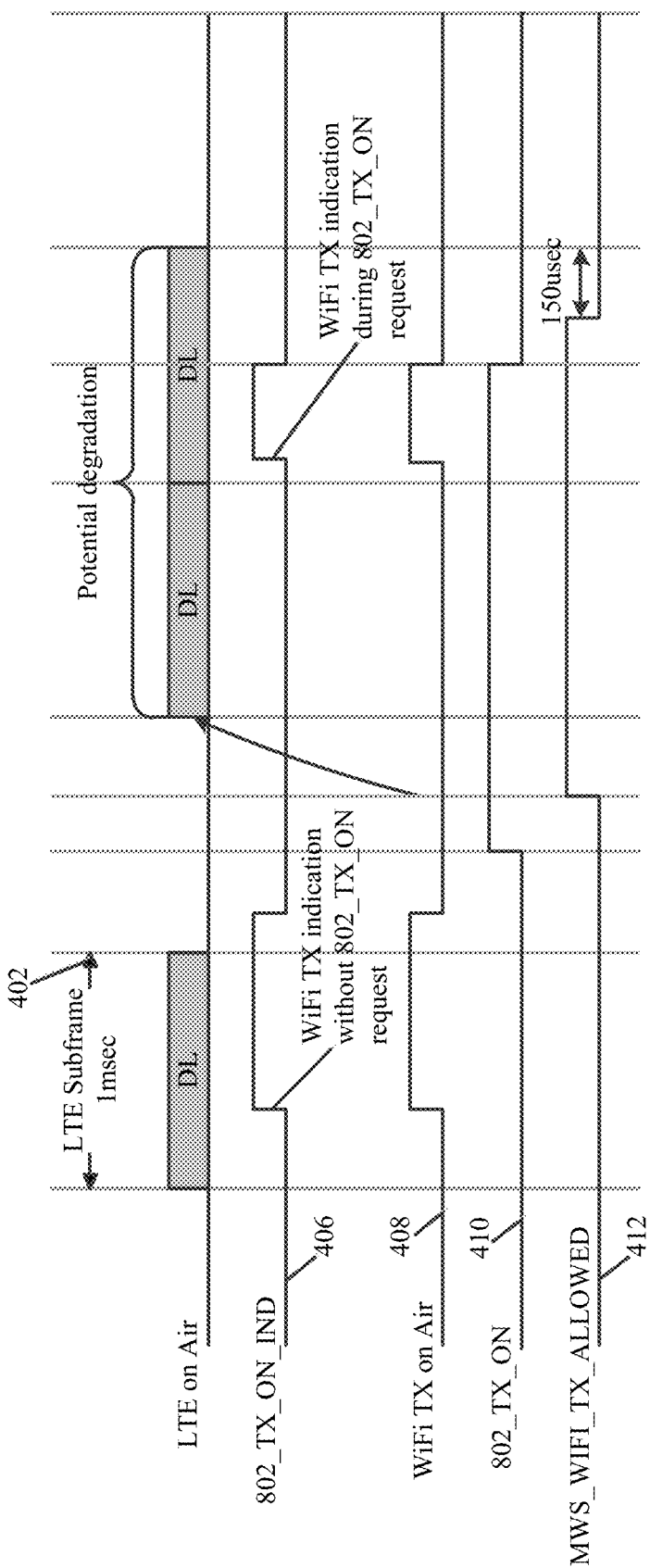
FIG. 4 is a schematic signaling diagram illustration demonstrating another signaling scheme between controllers of a multi-radio device, in accordance with some demonstrative embodiments.

Reference is made to FIG. 4, which includes a signaling diagram illustration demonstrating a signaling scheme between controllers of a multi-radio device, in accordance with some demonstrative embodiments. In some demonstrative embodiments, the signaling scheme of FIG. 4 may be implemented by controllers 110 and 120 (FIG. 1).

In some demonstrative embodiments, cellular radio 104 (FIG. 1) may communicate over the cellular network according to a sequence of LTE subframes 402, e.g., having a duration of 1 msec.

In some demonstrative embodiments, controller 120 (FIG. 1) may assert an 802_TX_ON_IND signal 406 to indicate an actual transmission 408 being performed by WLAN radio 108 (FIG. 1).

In some demonstrative embodiments, controller 120 (FIG. 1) may assert a 802_TX_ON signal 410, e.g., separate from the 802_TX_ON_IND signal 406, to indicate a request to transmit for requesting permission to transmit from WLAN radio 108 (FIG. 1). As shown in FIG. 4, controller 120 (FIG. 1) may assert the 802_TX_ON signal 410 prior to the actual transmission 408.

In some demonstrative embodiments, controller 110 (FIG. 1) may decide to grant the request to transmit, and may assert a MWS_WIFI_TX_ALLOWED signal 412 to indicate the request to transmit is granted.

Figure 5:
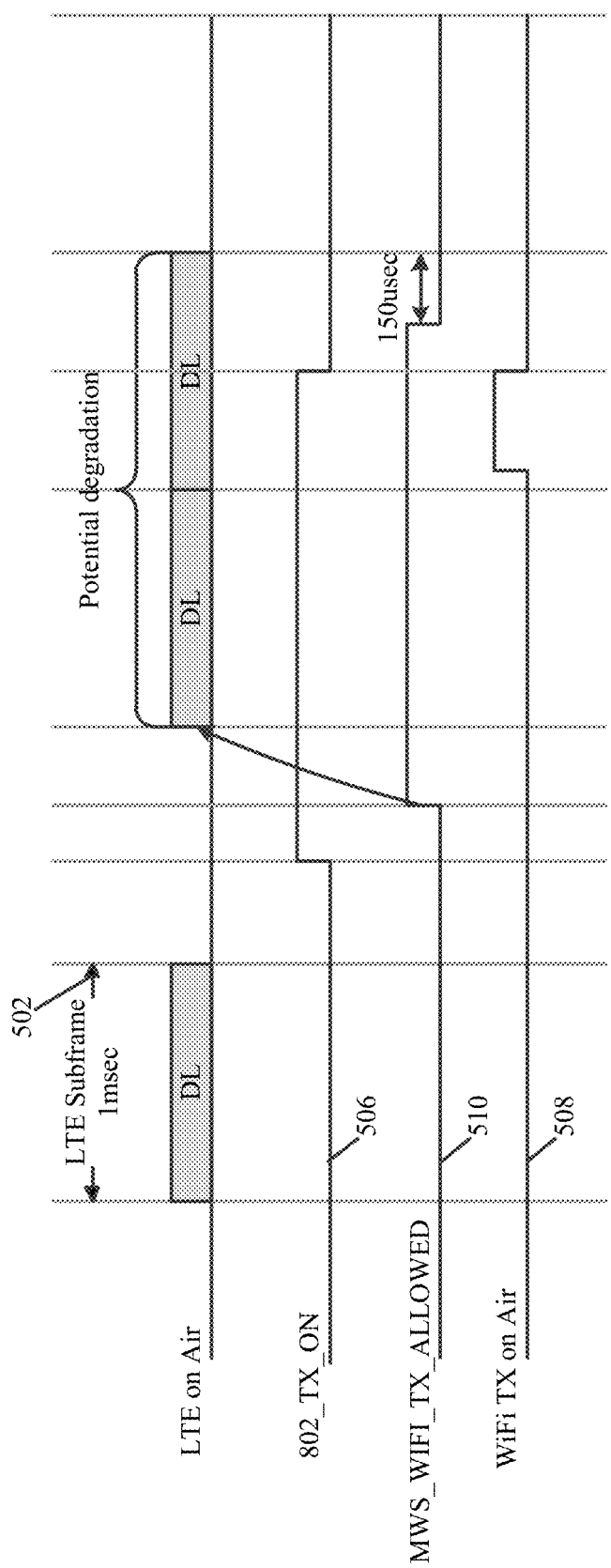
FIG. 5 is a schematic signaling diagram illustration demonstrating another signaling scheme between controllers of a multi-radio device, in accordance with some demonstrative embodiments.

Reference is made to FIG. 5, which includes a signaling diagram illustration demonstrating a signaling scheme between controllers of a multi-radio device, in accordance with some demonstrative embodiments. In some demonstrative embodiments, the signaling scheme of FIG. 5 may be implemented by controllers 110 and 120 (FIG. 1).

In some demonstrative embodiments, cellular radio 104 (FIG. 1) may communicate over the cellular network according to a sequence of LTE subframes 502, e.g., having a duration of 1 msec.

In some demonstrative embodiments, controller 120 (FIG. 1) may assert an 802_TX_ON signal 506 to indicate a request to transmit by WLAN radio 108 (FIG. 1). As shown in FIG. 5, controller 120 (FIG. 1) may assert the 802_TX_ON signal 506 prior to an actual transmission 508 being performed by WLAN radio 108 (FIG. 1).

In some demonstrative embodiments, controller 110 (FIG. 1) may decide to grant the request to transmit, and may assert a MWS_WIFI_TX_ALLOWED signal 512 to indicate the request to transmit is granted.

Figure 6:
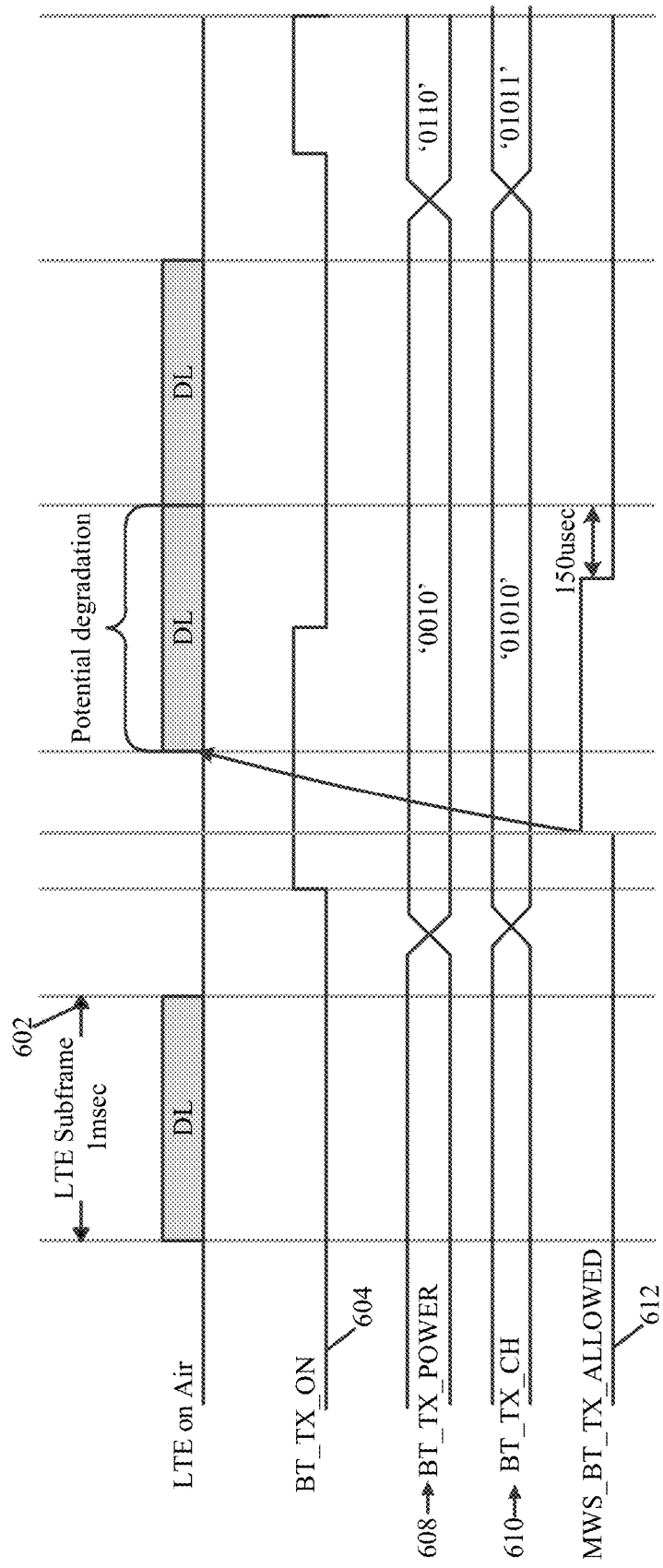
FIG. 6 is a schematic signaling diagram illustration demonstrating another signaling scheme between controllers of a multi-radio device, in accordance with some demonstrative embodiments.

Reference is made to FIG. 6, which includes a signaling diagram illustration demonstrating a signaling scheme between controllers of a multi-radio device, in accordance with some demonstrative embodiments. In some demonstrative embodiments, the signaling scheme of FIG. 6 may be implemented by controllers 110 and 120 (FIG. 1).

In some demonstrative embodiments, cellular radio 104 (FIG. 1) may communicate over the cellular network according to a sequence of LTE subframes 602, e.g., having a duration of 1 msec.

In some demonstrative embodiments, controller 120 (FIG. 1) may assert a BT_TX_ON signal 604 to indicate a request to transmit from BT radio 106 (FIG. 1).

In some demonstrative embodiments, controller 120 (FIG. 1) may send to controller 110 (FIG. 1) a BT_TX_POWER signal 608 to indicate a transmit power to be used by BT radio 106 (FIG. 1), and a BT_TX_CH signal 610 to indicate a BT channel to be used by BT radio 106 (FIG. 1).

In some demonstrative embodiments, controller 110 (FIG. 1) may decide to grant the request to transmit, and may assert a MWS_BT_TX_ALLOWED signal 612 to indicate the request to transmit is granted.

As shown in FIGS. 2, 4, and 6, cellular radio 104 (FIG. 1) may be allowed to receive DL frames, e.g., even when the MWS_WIFI_TX_ALLOWED and/or MWS_BT_TX_ALLOWED signals are asserted.

Figure 7:
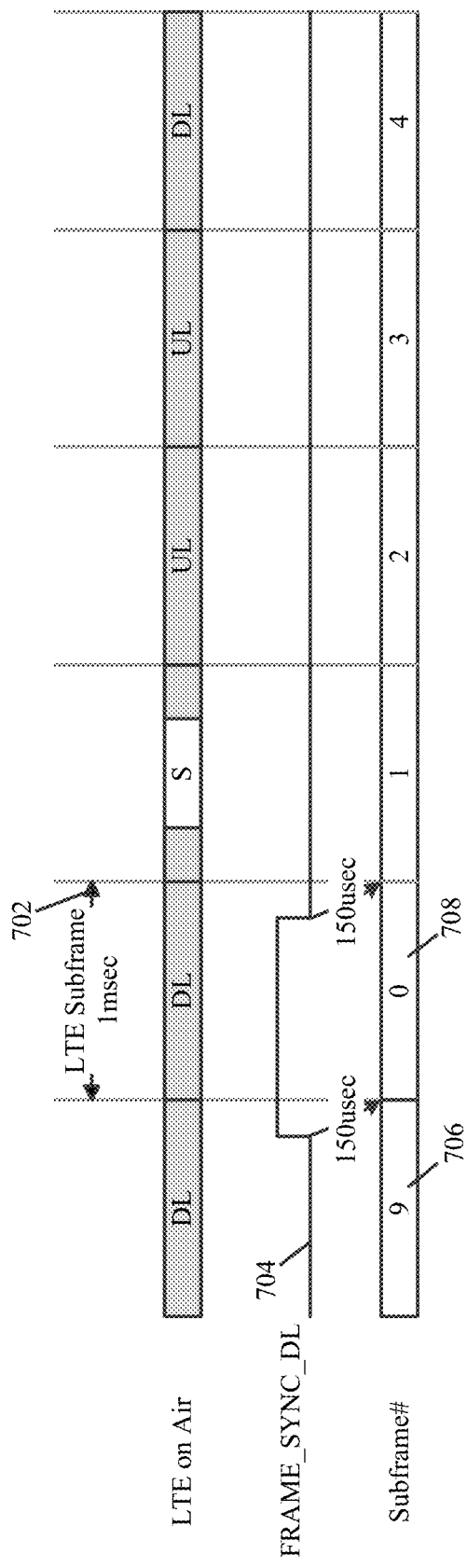
FIG. 7 is a schematic signaling diagram illustration demonstrating another signaling scheme between controllers of a multi-radio device, in accordance with some demonstrative embodiments.

Reference is made to FIG. 7, which includes a signaling diagram illustration demonstrating a signaling scheme between controllers of a multi-radio device, in accordance with some demonstrative embodiments. In some demonstrative embodiments, the signaling scheme of FIG. 6 may be implemented by controllers 110 and 120 (FIG. 1).

In some demonstrative embodiments, cellular radio 104 (FIG. 1) may communicate over the cellular network according to a sequence of LTE subframes 702, e.g., having a duration of 1 msec.

In some demonstrative embodiments, controller 110 (FIG. 1) may assert a FRAME_SYNC_DL signal 704 during a subframe#9 706, e.g., 150 usec prior to a beginning of a subframe#0 708. Controller 110 (FIG. 1) may de-assert the FRAME_SYNC_DL signal 704, e.g., 150 usec prior to an end of the subframe#0 708.

Figure 8:
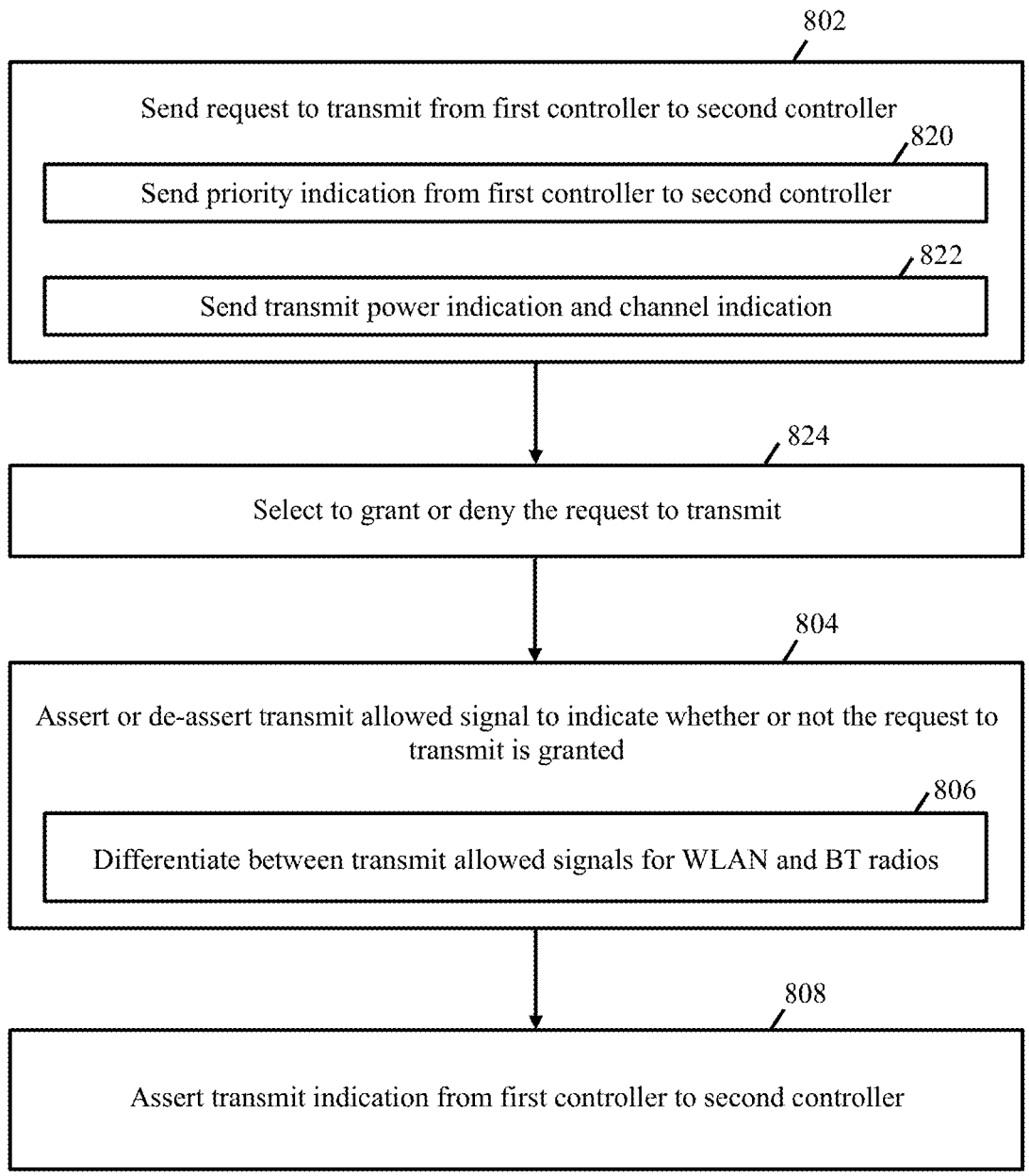
FIG. 8 is a schematic flow-chart illustration of a method of controlling communications of a multi-radio device, in accordance with some demonstrative embodiments.

Reference is made to FIG. 8, which schematically illustrates a method of a controlling communication of a multi-radio device, in accordance with some demonstrative embodiments. In some demonstrative embodiments, one or more of the operations of the method of FIG. 8 may be performed by one or more elements of a system, e.g., system 100 (FIG. 1). In one example, one or more of the operations of the method of FIG. 8 may be performed at a multi-radio device, e.g., multi-radio device 102 (FIG. 1), for example, by a controller, e.g., controller 110 (FIG. 1) and/or controller 120 (FIG. 1).

As indicated at block 802 the method may include sending a request to transmit from a first controller of a first radio to a second controller of a second radio, via an interface between the first and second controllers. The request to transmit may indicate a request to allow the first radio to transmit over a first wireless network. For example, controller 120 (FIG. 1) may send to controller 110 (FIG. 1) a request to transmit to request permission for a transmission to be performed by WLAN radio 108 (FIG. 1) and/or BT radio (FIG. 1), e.g., as described above.

As indicated at block 820, the method may include sending from the first controller to the second controller a priority indication to indicate that the request to transmit has a first priority, or a second priority, higher than the first priority. For example, controller 120 (FIG. 1) may send the CONNECTION_PRI_SIGNAL to indicate if the request to transmit has the first or second priority, e.g., as described above.

As indicated at block 822, the method may include sending from the first controller to the second controller an indication of a BT transmit power and a BT transmit channel to be used by the first radio. For example, controller 120 (FIG. 1) may send the signals BT_TX_POWER and BT_TX_CH to controller 110 (FIG. 1), e.g., as described above.

As indicated at block 824, the method may include selecting to grant or deny the request to transmit. For example, controller 110 (FIG. 1) may select to grant or deny the request to transmit, e.g., as described above.

As indicated at block 804, the method may include asserting or de-asserting a transmit-allowed signal from the second controller to the first controller over the interface, e.g., to indicate that the request to transmit is granted, or to indicate that the request to transmit is denied. For example, controller 110 (FIG. 1) may assert or de-assert the signals MWS_BT_TX_ALLOWED and/or MWS_WIFI_TX_ALLOWED, e.g., as described above.

As indicated at block 806, the method may include sending first and second separate transmit-allowed signals to separately indicate whether transmit requests of a WLAN radio and a BT radio are granted or denied. For example, controller 110 (FIG. 1) may be configured to separately use the MWS_BT_TX_ALLOWED signal in response to transmit requests from BT radio 106 (FIG. 1), and the MWS_WIFI_TX_ALLOWED signal in response to transmit requests from WLAN radio 108 (FIG. 1), e.g., as described above.

As indicated at block 808, the method may include asserting a transmit indication from the first controller to the second controller over the interface, to indicate actual transmission by the first radio over the first wireless network. For example, controller 120 (FIG. 1) may assert the signal 802_TX_ON_IND to indicate actual transmission being performed by WLAN radio 108 (FIG. 1), e.g., as described above.

Figure 9:
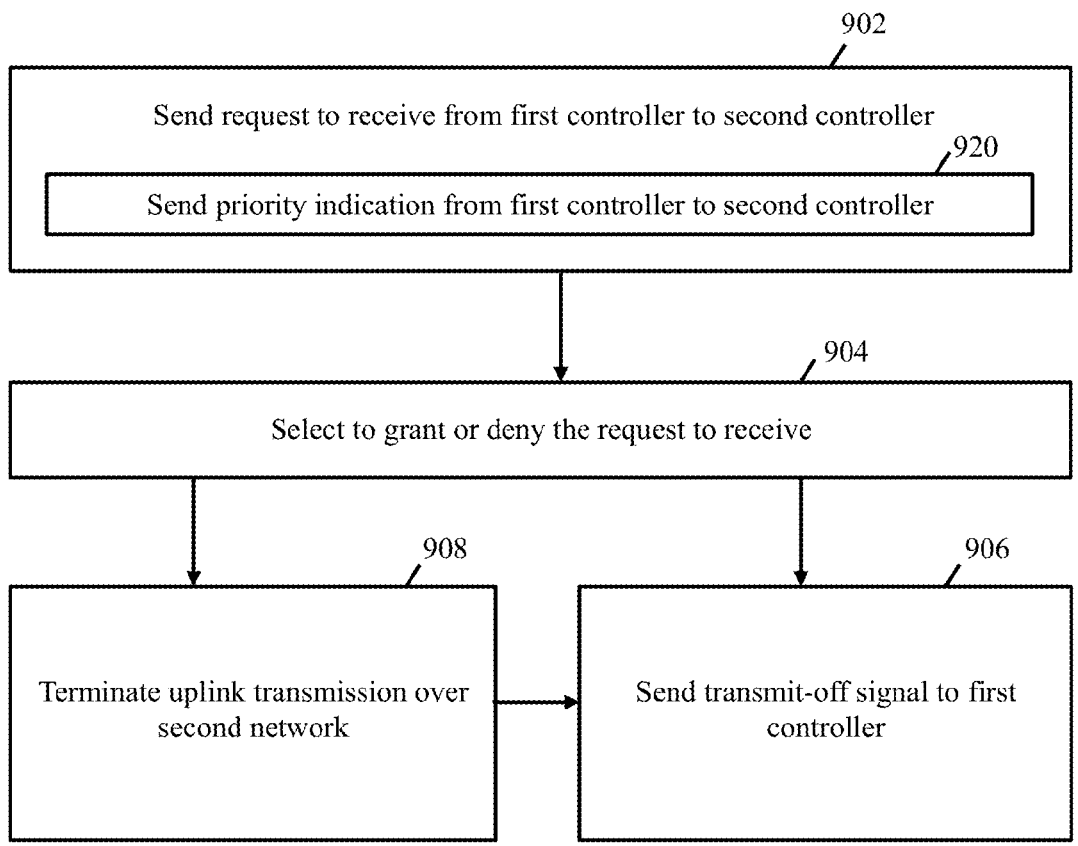
FIG. 9 is a schematic flow-chart illustration of another method of controlling communications of a multi-radio device, in accordance with some demonstrative embodiments.

Reference is made to FIG. 9, which schematically illustrates a method of a controlling communication of a multi-radio device, in accordance with some demonstrative embodiments. In some demonstrative embodiments, one or more of the operations of the method of FIG. 9 may be performed by one or more elements of a system, e.g., system 100 (FIG. 1). In one example, one or more of the operations of the method of FIG. 9 may be performed at a multi-radio device, e.g., multi-radio device 102 (FIG. 1), for example, by a controller, e.g., controller 110 (FIG. 1) and/or controller 120 (FIG. 1).

As indicated at block 902 the method may include sending a request to receive from a first controller of a first radio to a second controller of a second radio, via an interface between the first and second controllers. The request to receive may indicate a request to allow the first radio to receive over a first wireless network. For example, controller 120 (FIG. 1) may send to controller 110 (FIG. 1) a request to receive to request permission to receive a communication by WLAN radio 108 (FIG. 1) and/or BT radio (FIG. 1), e.g., as described above.

As indicated at block 920, the method may include sending from the first controller to the second controller a priority indication to indicate that the request to receive has a first priority, or a second priority, higher than the first priority. For example, controller 120 (FIG. 1) may send the CONNECTION_PRI SIGNAL to indicate if the request to receive has the first or second priority, e.g., as described above.

As indicated at block 904, the method may include selecting between granting the request to receive and denying the request to receive. For example, controller 110 (FIG. 1) may select between granting and denying the request to receive, e.g., as described above.

As indicated at block 906, the method may include sending over the interface a transmit-off signal to indicate a time period during which the second radio is not to transmit over a second wireless network, e.g., when granting the request to receive. For example, controller 110 (FIG. 1) may assert the signal MWS_TX_OFF, if selecting to grant the request to receive, e.g., as described above.

As indicated at block 908, the method may include terminating an uplink transmission over the second wireless network, when selecting to grant the request to receive during the uplink transmission. For example, controller 110 (FIG. 1) may terminate an UL transmission by cellular radio 104 (FIG. 1), e.g., as described above.

Figure 10:
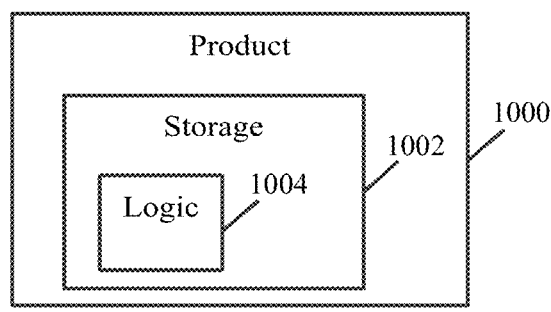
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of multi-radio device 102, controller 110 (FIG. 1), controller 110 (FIG. 1), and/or to perform one or more of the operations of the method of FIG. 7 and/or FIG. 8. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes multi-radio device comprising a first radio to communicate over a first wireless network; a first controller to control the first radio; a second radio to communicate over a second wireless network; a second controller to control the second radio; and an interface to communicate signaling messages between the first and second controllers, wherein the first controller is to send to the second controller a request to transmit, the request to transmit indicating a request to allow the first radio to transmit over the first wireless network, and wherein the second controller is to assert a transmit-allowed signal over the interface to indicate that the request to transmit is granted, or to de-assert the transmit-allowed signal to indicate that the request to transmit is denied.

Example 2 includes the subject matter of Example 1, and optionally, wherein the first controller is to send the request to transmit by asserting a transmit-on signal prior to a time for transmitting over the first network.

Example 3 includes the subject matter of Example 1 or 2, and optionally, wherein the first controller is to control communication of a third radio over a third network, wherein the second controller is to send a first transmit allowed signal to indicate if a request to transmit over the first wireless network is granted, and a second transmit allowed signal to indicate if a request to transmit over the second wireless network is granted.

Example 4 includes the subject matter of Example 3, and optionally, wherein the first radio comprises a Bluetooth radio, and the third radio comprises a Wireless Local Area Network (WLAN) radio.

Example 5 includes the subject matter of any one of Examples 1-4, and optionally, wherein the first controller is to assert a transmit indication over the interface to indicate actual transmission by the first radio over the first wireless network.

Example 6 includes the subject matter of Example 5, and optionally, wherein the first controller is to send the request to transmit by asserting a first signaling bit and setting a second signaling bit to a first value indicating the first signaling bit includes the request to transmit, and wherein the first controller is to assert the transmit indication by asserting the first signaling bit and setting the second signaling bit to a second value indicating the first signaling bit includes the transmit indication.

Example 7 includes the subject matter of Example 6, and optionally, wherein the first signaling bit comprises a Transmit On (TX_ON) signaling bit.

Example 8 includes the subject matter of any one of Examples 1-7, and optionally, wherein the request to transmit includes a priority indication to indicate the request to transmit has a first priority, or a second priority, higher than the first priority.

Example 9 includes the subject matter of any one of Examples 1-8, and optionally, wherein the second controller is to assert a downlink synchronization signal to indicate a timing of a downlink subframe over the second wireless network.

Example 10 includes the subject matter of any one of Examples 1-9, and optionally, wherein the first radio comprises a Bluetooth (BT) radio.

Example 11 includes the subject matter of Example 10, and optionally, wherein the request to transmit includes an indication of a BT transmit power and a BT transmit channel.

Example 12 includes the subject matter of any one of Examples 1-9, and optionally, wherein the first radio comprises a Wireless Local Area Network (WLAN) radio.

Example 13 includes the subject matter of any one of Examples 1-12, and optionally, wherein the second radio comprises a cellular radio.

Example 14 includes the subject matter of Example 13, and optionally, wherein the cellular radio comprises a Long Term Evolution (LTE) radio.

Example 15 includes the subject matter of any one of Examples 1-14, and optionally, wherein the interface comprises a universal asynchronous receiver/transmitter (UART) interface.

Example 16 includes the subject matter of any one of Examples 1-15 being a mobile device including one or more antennas, a processor, and a memory.

Example 17 includes a multi-radio device comprising a first radio to communicate over a first wireless network; a first controller to control the first radio; a second radio to communicate over a second wireless network; a second controller to control the second radio; and an interface to communicate signaling messages between the first and second controllers, wherein the first controller is to send to the second controller a request to receive, the request to receive indicating a request to allow the first radio to receive over the first wireless network, wherein the second controller is to select between granting the request to receive and denying the request to receive, and when, granting the request to receive, the controller is to send over the interface a transmit-off signal to indicate a time period during which the second radio is not to transmit over the second wireless network.

Example 18 includes the subject matter of Example 17, and optionally, wherein the second controller is to terminate an uplink transmission over the second wireless network, when selecting to grant the request to receive during the uplink transmission.

Example 19 includes the subject matter of Example 17 or 18, and optionally, wherein the second controller is to receive the request to receive during a sub-frame period of the second wireless network, and to send the transmit-off signal during the sub-frame.

Example 20 includes the subject matter of any one of Examples 17-19, and optionally, wherein the second controller is to assert a transmit indication signal a predefined assert-offset time prior to beginning an uplink transmission over the second wireless network, and to de-assert the transmit indication signal a predefined de-assert-offset time after ending the uplink transmission over the second wireless network, and wherein the second controller is to send the transmit-off signal, prior to de-asserting the transmit indication signal.

Example 21 includes the subject matter of any one of Examples 17-20, and optionally, wherein the request to receive includes a priority indication to indicate the request to receive has a first priority, or a second priority, higher than the first priority.

Example 22 includes the subject matter of any one of Examples 17-21, and optionally, wherein the second controller is to assert a downlink synchronization signal to indicate a timing of a downlink subframe over the second wireless network.

Example 23 includes the subject matter of any one of Examples 17-22, and optionally, wherein the first radio comprises a Bluetooth (BT) radio.

Example 24 includes the subject matter of any one of Examples 17-22, and optionally, wherein the first radio comprises a Wireless Local Area Network (WLAN) radio.

Example 25 includes the subject matter of any one of Examples 17-24, and optionally, wherein the second radio comprises a cellular radio.

Example 26 includes the subject matter of Example 25, and optionally, wherein the cellular radio comprises a Long Term Evolution (LTE) radio.

Example 27 includes the subject matter of any one of Examples 17-26, and optionally, wherein the interface comprises a universal asynchronous receiver/transmitter (UART) interface.

Example 28 includes the subject matter of any one of Examples 17-27 being a mobile device including one or more antennas, a processor, and a memory.

Example 29 includes a wireless communication system comprising one or more antennas; a processor; a memory; a first radio to communicate over a first wireless network; a first controller to control the first radio; a second radio to communicate over a second wireless network; a second controller to control the second radio; and an interface to communicate signaling messages between the first and second controllers, wherein the first controller is to send to the second controller a request to transmit, the request to transmit indicating a request to allow the first radio to transmit over the first wireless network, and wherein the second controller is to assert a transmit-allowed signal over the interface to indicate that the request to transmit is granted, or to de-assert the transmit-allowed signal to indicate that the request to transmit is denied.

Example 30 includes the subject matter of Example 29, and optionally, wherein the first controller is to send the request to transmit by asserting a transmit-on signal prior to a time for transmitting over the first network.

Example 31 includes the subject matter of Example 29 or 30, and optionally, wherein the first controller is to control communication of a third radio over a third network, wherein the second controller is to send a first transmit allowed signal to indicate if a request to transmit over the first wireless network is granted, and a second transmit allowed signal to indicate if a request to transmit over the second wireless network is granted.

Example 32 includes the subject matter of Example 31, and optionally, wherein the first radio comprises a Bluetooth radio, and the third radio comprises a Wireless Local Area Network (WLAN) radio.

Example 33 includes the subject matter of any one of Examples 29-32, and optionally, wherein the first controller is to assert a transmit indication over the interface to indicate actual transmission by the first radio over the first wireless network.

Example 34 includes the subject matter of Example 33, and optionally, wherein the first controller is to send the request to transmit by asserting a first signaling bit and setting a second signaling bit to a first value indicating the first signaling bit includes the request to transmit, and wherein the first controller is to assert the transmit indication by asserting the first signaling bit and setting the second signaling bit to a second value indicating the first signaling bit includes the transmit indication.

Example 35 includes the subject matter of Example 34, and optionally, wherein the first signaling bit comprises a Transmit On (TX_ON) signaling bit.

Example 36 includes the subject matter of any one of Examples 29-35, and optionally, wherein the request to transmit includes a priority indication to indicate the request to transmit has a first priority, or a second priority, higher than the first priority.

Example 37 includes the subject matter of any one of Examples 29-36, and optionally, wherein the second controller is to assert a downlink synchronization signal to indicate a timing of a downlink subframe over the second wireless network.

Example 38 includes the subject matter of any one of Examples 29-37, and optionally, wherein the first radio comprises a Bluetooth (BT) radio.

Example 39 includes the subject matter of Example 38, and optionally, wherein the request to transmit includes an indication of a BT transmit power and a BT transmit channel.

Example 40 includes the subject matter of any one of Examples 29-37, and optionally, wherein the first radio comprises a Wireless Local Area Network (WLAN) radio.

Example 41 includes the subject matter of any one of Examples 29-40 wherein the second radio comprises a cellular radio.

Example 42 includes the subject matter of Example 41, and optionally, wherein the cellular radio comprises a Long Term Evolution (LTE) radio.

Example 43 includes the subject matter of any one of Examples 29-42, and optionally, wherein the interface comprises a universal asynchronous receiver/transmitter (UART) interface.

Example 44 includes a wireless communication system comprising one or more antennas; a processor; a memory; a first radio to communicate over a first wireless network; a first controller to control the first radio; a second radio to communicate over a second wireless network; a second controller to control the second radio; and an interface to communicate signaling messages between the first and second controllers, wherein the first controller is to send to the second controller a request to receive, the request to receive indicating a request to allow the first radio to receive over the first wireless network, wherein the second controller is to select between granting the request to receive and denying the request to receive, and when, granting the request to receive, the controller is to send over the interface a transmit-off signal to indicate a time period during which the second radio is not to transmit over the second wireless network.

Example 45 includes the subject matter of Example 44, and optionally, wherein the second controller is to terminate an uplink transmission over the second wireless network, when selecting to grant the request to receive during the uplink transmission.

Example 46 includes the subject matter of Example 44 or 45, and optionally, wherein the second controller is to receive the request to receive during a sub-frame period of the second wireless network, and to send the transmit-off signal during the sub-frame.

Example 47 includes the subject matter of any one of Examples 44-46, and optionally, wherein the second controller is to assert a transmit indication signal a predefined assert-offset time prior to beginning an uplink transmission over the second wireless network, and to de-assert the transmit indication signal a predefined de-assert-offset time after ending the uplink transmission over the second wireless network, and wherein the second controller is to send the transmit-off signal, prior to de-asserting the transmit indication signal.

Example 48 includes the subject matter of any one of Examples 44-47, and optionally, wherein the request to receive includes a priority indication to indicate the request to receive has a first priority, or a second priority, higher than the first priority.

Example 49 includes the subject matter of any one of Examples 44-48, and optionally, wherein the second controller is to assert a downlink synchronization signal to indicate a timing of a downlink subframe over the second wireless network.

Example 50 includes the subject matter of any one of Examples 44-49, and optionally, wherein the first radio comprises a Bluetooth (BT) radio.

Example 51 includes the subject matter of any one of Examples 44-49, and optionally, wherein the first radio comprises a Wireless Local Area Network (WLAN) radio.

Example 52 includes the subject matter of any one of Examples 44-51, and optionally, wherein the second radio comprises a cellular radio.

Example 53 includes the subject matter of Example 52, and optionally, wherein the cellular radio comprises a Long Term Evolution (LTE) radio.

Example 54 includes the subject matter of any one of Examples 44-53, and optionally, wherein the interface comprises a universal asynchronous receiver/transmitter (UART) interface.

Example 55 includes a method of wireless communication to be performed by a multi-radio device including a first controller to control a first radio to communicate over a first wireless network, and a second controller to control a second radio to communicate over a second wireless network, the method comprising sending a request to transmit from the first controller to the second controller, the request to transmit indicating a request to allow the first radio to transmit over the first wireless network; and selecting between asserting and de-asserting a transmit-allowed signal from the second controller to the first controller, wherein asserting the transmit-allowed signal is to indicate that the request to transmit is granted, and de-asserting the transmit-allowed signal is to indicate that the request to transmit is denied.

Example 56 includes the subject matter of Example 55, and optionally, comprising sending the request to transmit by asserting a transmit-on signal prior to a time for transmitting over the first network.

Example 57 includes the subject matter of Example 55 or 56, and optionally, wherein the first controller is to control communication of a third radio over a third network, the method comprising sending from the second controller a first transmit allowed signal to indicate if a request to transmit over the first wireless network is granted, and a second transmit allowed signal to indicate if a request to transmit over the second wireless network is granted.

Example 58 includes the subject matter of Example 57, and optionally, wherein the first radio comprises a Bluetooth radio, and the third radio comprises a Wireless Local Area Network (WLAN) radio.

Example 59 includes the subject matter of any one of Examples 55-58, and optionally, comprising asserting a transmit indication over the interface to indicate to the second controller actual transmission by the first radio over the first wireless network.

Example 60 includes the subject matter of Example 59, and optionally, comprising sending the request to transmit by asserting a first signaling bit and setting a second signaling bit to a first value indicating the first signaling bit includes the request to transmit, and asserting the transmit indication by asserting the first signaling bit and setting the second signaling bit to a second value indicating the first signaling bit includes the transmit indication.

Example 61 includes the subject matter of Example 60, and optionally, wherein the first signaling bit comprises a Transmit On (TX_ON) signaling bit.

Example 62 includes the subject matter of any one of Examples 55-61, and optionally, wherein the request to transmit includes a priority indication to indicate the request to transmit has a first priority, or a second priority, higher than the first priority.

Example 63 includes the subject matter of any one of Examples 55-62, and optionally, comprising asserting a downlink synchronization signal from the second controller to the first controller to indicate a timing of a downlink subframe over the second wireless network.

Example 64 includes the subject matter of any one of Examples 55-63, and optionally, wherein the first radio comprises a Bluetooth (BT) radio.

Example 65 includes the subject matter of Example 64, and optionally, wherein the request to transmit includes an indication of a BT transmit power and a BT transmit channel.

Example 66 includes the subject matter of any one of Examples 55-63, and optionally, wherein the first radio comprises a Wireless Local Area Network (WLAN) radio.

Example 67 includes the subject matter of any one of Examples 55-66, and optionally, wherein the second radio comprises a cellular radio.

Example 68 includes the subject matter of Example 67, and optionally, wherein the cellular radio comprises a Long Term Evolution (LTE) radio.

Example 69 includes a method of wireless communication to be performed by a multi-radio device including a first controller to control a first radio to communicate over a first wireless network, and a second controller to control a second radio to communicate over a second wireless network, the method comprising sending a request to receive from the first controller to the second controller, the request to receive indicating a request to allow the first radio to receive over the first wireless network; at the second controller, selecting between granting the request to receive and denying the request to receive; and when, granting the request to receive, sending from the second controller to the first controller a transmit-off signal to indicate a time period during which the second radio is not to transmit over the second wireless network.

Example 70 includes the subject matter of Example 69, and optionally, comprising terminating an uplink transmission over the second wireless network, when selecting to grant the request to receive during the uplink transmission.

Example 71 includes the subject matter of Example 69 or 70, and optionally, comprising receiving the request to receive at the second controller during a sub-frame period of the second wireless network, and sending the transmit-off signal during the sub-frame.

Example 72 includes the subject matter of any one of Examples 69-71, and optionally, comprising asserting a transmit indication signal from the second controller to the first controller a predefined assert-offset time prior to beginning an uplink transmission over the second wireless network, de-asserting the transmit indication signal a predefined de-assert-offset time after ending the uplink transmission over the second wireless network, and sending the transmit-off signal, prior to de-asserting the transmit indication signal.

Example 73 includes the subject matter of any one of Examples 69-72, and optionally, wherein the request to receive includes a priority indication to indicate the request to receive has a first priority, or a second priority, higher than the first priority.

Example 74 includes the subject matter of any one of Examples 69-73, and optionally, comprising asserting a downlink synchronization signal from the second controller to the first controller to indicate a timing of a downlink subframe over the second wireless network.

Example 75 includes the subject matter of any one of Examples 69-74, and optionally, wherein the first radio comprises a Bluetooth (BT) radio.

Example 76 includes the subject matter of any one of Examples 69-74, and optionally, wherein the first radio comprises a Wireless Local Area Network (WLAN) radio.

Example 77 includes the subject matter of any one of Examples 69-76, and optionally, wherein the second radio comprises a cellular radio.

Example 78 includes the subject matter of Example 77, and optionally, wherein the cellular radio comprises a Long Term Evolution (LTE) radio.

Example 79 includes a product including one or more tangible computer-readable non-transitory storage media comprising computer-executable instructions operable to, when executed by at least one computer processor, enable the at least one computer processor to implement a method at a multi-radio device including a first controller to control a first radio to communicate over a first wireless network, and a second controller to control a second radio to communicate over a second wireless network, the method comprising sending a request to transmit from the first controller to the second controller, the request to transmit indicating a request to allow the first radio to transmit over the first wireless network; and selecting between asserting and de-asserting a transmit-allowed signal from the second controller to the first controller, wherein asserting the transmit-allowed signal is to indicate that the request to transmit is granted, and de-asserting the transmit-allowed signal is to indicate that the request to transmit is denied.

Example 80 includes the subject matter of Example 79, and optionally, wherein the method comprises sending the request to transmit by asserting a transmit-on signal prior to a time for transmitting over the first network.

Example 81 includes the subject matter of Example 79 or 80, and optionally, wherein the first controller is to control communication of a third radio over a third network, the method comprising sending from the second controller a first transmit allowed signal to indicate if a request to transmit over the first wireless network is granted, and a second transmit allowed signal to indicate if a request to transmit over the second wireless network is granted.

Example 82 includes the subject matter of Example 81, and optionally, wherein the first radio comprises a Bluetooth radio, and the third radio comprises a Wireless Local Area Network (WLAN) radio.

Example 83 includes the subject matter of any one of Examples 79-82, and optionally, wherein the method comprises asserting a transmit indication over the interface to indicate to the second controller actual transmission by the first radio over the first wireless network.

Example 84 includes the subject matter of Example 83, and optionally, wherein the method comprises sending the request to transmit by asserting a first signaling bit and setting a second signaling bit to a first value indicating the first signaling bit includes the request to transmit, and asserting the transmit indication by asserting the first signaling bit and setting the second signaling bit to a second value indicating the first signaling bit includes the transmit indication.

Example 85 includes the subject matter of Example 84, and optionally, wherein the first signaling bit comprises a Transmit On (TX_ON) signaling bit.

Example 86 includes the subject matter of any one of Examples 79-85, and optionally, wherein the request to transmit includes a priority indication to indicate the request to transmit has a first priority, or a second priority, higher than the first priority.

Example 87 includes the subject matter of any one of Examples 79-86, and optionally, wherein the method comprises asserting a downlink synchronization signal from the second controller to the first controller to indicate a timing of a downlink subframe over the second wireless network.

Example 88 includes the subject matter of any one of Examples 79-87, and optionally, wherein the first radio comprises a Bluetooth (BT) radio.

Example 89 includes the subject matter of Example 88, and optionally, wherein the request to transmit includes an indication of a BT transmit power and a BT transmit channel.

Example 90 includes the subject matter of any one of Examples 79-87, and optionally, wherein the first radio comprises a Wireless Local Area Network (WLAN) radio.

Example 91 includes the subject matter of any one of Examples 79-90, and optionally, wherein the second radio comprises a cellular radio.

Example 92 includes the subject matter of Example 91, and optionally, wherein the cellular radio comprises a Long Term Evolution (LTE) radio.

Example 93 includes a product including one or more tangible computer-readable non-transitory storage media comprising computer-executable instructions operable to, when executed by at least one computer processor, enable the at least one computer processor to implement a method at a multi-radio device including a first controller to control a first radio to communicate over a first wireless network, and a second controller to control a second radio to communicate over a second wireless network, the method comprising sending a request to receive from the first controller to the second controller, the request to receive indicating a request to allow the first radio to receive over the first wireless network; at the second controller, selecting between granting the request to receive and denying the request to receive; and when, granting the request to receive, sending from the second controller to the first controller a transmit-off signal to indicate a time period during which the second radio is not to transmit over the second wireless network.

Example 94 includes the subject matter of Example 93, and optionally, wherein the method comprises terminating an uplink transmission over the second wireless network, when selecting to grant the request to receive during the uplink transmission.

Example 95 includes the subject matter of Example 93 or 94, and optionally, wherein the method comprises receiving the request to receive at the second controller during a sub-frame period of the second wireless network, and sending the transmit-off signal during the sub-frame.

Example 96 includes the subject matter of any one of Examples 93-95, and optionally, wherein the method comprises asserting a transmit indication signal from the second controller to the first controller a predefined assert-offset time prior to beginning an uplink transmission over the second wireless network, de-asserting the transmit indication signal a predefined de-assert-offset time after ending the uplink transmission over the second wireless network, and sending the transmit-off signal, prior to de-asserting the transmit indication signal.

Example 97 includes the subject matter of any one of Examples 93-96, and optionally, wherein the request to receive includes a priority indication to indicate the request to receive has a first priority, or a second priority, higher than the first priority.

Example 98 includes the subject matter of any one of Examples 93-97, and optionally, wherein the method comprises asserting a downlink synchronization signal from the second controller to the first controller to indicate a timing of a downlink subframe over the second wireless network.

Example 99 includes the subject matter of any one of Examples 93-98, and optionally, wherein the first radio comprises a Bluetooth (BT) radio.

Example 100 includes the subject matter of any one of Examples 93-98, and optionally, wherein the first radio comprises a Wireless Local Area Network (WLAN) radio.

Example 101 includes the subject matter of any one of Examples 93-100, and optionally, wherein the second radio comprises a cellular radio.

Example 102 includes the subject matter of Example 101, and optionally, wherein the cellular radio comprises a Long Term Evolution (LTE) radio.

Example 103 includes an apparatus of wireless communication, the apparatus comprising means for sending a request to transmit from a first controller to a second controller of a multi-radio device via an interface between the first and second controllers, the first controller to control a first radio to communicate over a first wireless network and the second controller to control a second radio to communicate over a second wireless network, the request to transmit indicating a request to allow the first radio to transmit over the first wireless network; and means for selecting between asserting and de-asserting a transmit-allowed signal from the second controller to the first controller, wherein asserting the transmit-allowed signal is to indicate that the request to transmit is granted, and de-asserting the transmit-allowed signal is to indicate that the request to transmit is denied.

Example 104 includes the subject matter of Example 103, and optionally, comprising means for sending the request to transmit by asserting a transmit-on signal prior to a time for transmitting over the first network.

Example 105 includes the subject matter of Example 103 or 104, and optionally, wherein the first controller is to control communication of a third radio over a third network, the apparatus comprising means for sending from the second controller a first transmit allowed signal to indicate if a request to transmit over the first wireless network is granted, and a second transmit allowed signal to indicate if a request to transmit over the second wireless network is granted.

Example 106 includes the subject matter of Example 105, and optionally, wherein the first radio comprises a Bluetooth radio, and the third radio comprises a Wireless Local Area Network (WLAN) radio.

Example 107 includes the subject matter of any one of Examples 103-106, and optionally, comprising means for asserting a transmit indication over the interface to indicate to the second controller actual transmission by the first radio over the first wireless network.

Example 108 includes the subject matter of Example 107, and optionally, comprising means for sending the request to transmit by asserting a first signaling bit and setting a second signaling bit to a first value indicating the first signaling bit includes the request to transmit, and asserting the transmit indication by asserting the first signaling bit and setting the second signaling bit to a second value indicating the first signaling bit includes the transmit indication.

Example 109 includes the subject matter of Example 108, and optionally, wherein the first signaling bit comprises a Transmit On (TX_ON) signaling bit.

Example 110 includes the subject matter of any one of Examples 103-109, and optionally, wherein the request to transmit includes a priority indication to indicate the request to transmit has a first priority, or a second priority, higher than the first priority.

Example 111 includes the subject matter of any one of Examples 103-110, and optionally, comprising means for asserting a downlink synchronization signal from the second controller to the first controller to indicate a timing of a downlink subframe over the second wireless network.

Example 112 includes the subject matter of any one of Examples 103-111, and optionally, wherein the first radio comprises a Bluetooth (BT) radio.

Example 113 includes the subject matter of Example 112, and optionally, wherein the request to transmit includes an indication of a BT transmit power and a BT transmit channel.

Example 114 includes the subject matter of any one of Examples 103-111, and optionally, wherein the first radio comprises a Wireless Local Area Network (WLAN) radio.

Example 115 includes the subject matter of any one of Examples 103-114, and optionally, wherein the second radio comprises a cellular radio.

Example 116 includes the subject matter of Example 115, and optionally, wherein the cellular radio comprises a Long Term Evolution (LTE) radio.

Example 117 includes an apparatus of wireless communication, the apparatus comprising means for sending a request to receive from a first controller to a second controller of a multi-radio device via an interface between the first and second controllers, the first controller to control a first radio to communicate over a first wireless network and the second controller to control a second radio to communicate over a second wireless network, the request to receive indicating a request to allow the first radio to receive over the first wireless network; means for selecting, at the second controller, between granting the request to receive and denying the request to receive; and means for, when granting the request to receive, sending from the second controller to the first controller a transmit-off signal to indicate a time period during which the second radio is not to transmit over the second wireless network.

Example 118 includes the subject matter of Example 117, and optionally, comprising means for terminating an uplink transmission over the second wireless network, when selecting to grant the request to receive during the uplink transmission.

Example 119 includes the subject matter of Example 117 or 118, and optionally, comprising means for receiving the request to receive at the second controller during a sub-frame period of the second wireless network, and sending the transmit-off signal during the sub-frame.

Example 120 includes the subject matter of any one of Examples 117-119, and optionally, comprising means for asserting a transmit indication signal from the second controller to the first controller a predefined assert-offset time prior to beginning an uplink transmission over the second wireless network, de-asserting the transmit indication signal a predefined de-assert-offset time after ending the uplink transmission over the second wireless network, and sending the transmit-off signal, prior to de-asserting the transmit indication signal.

Example 121 includes the subject matter of any one of Examples 117-120, and optionally, wherein the request to receive includes a priority indication to indicate the request to receive has a first priority, or a second priority, higher than the first priority.

Example 122 includes the subject matter of any one of Examples 117-121, and optionally, comprising means for asserting a downlink synchronization signal from the second controller to the first controller to indicate a timing of a downlink subframe over the second wireless network.

Example 123 includes the subject matter of any one of Examples 117-122, and optionally, wherein the first radio comprises a Bluetooth (BT) radio.

Example 124 includes the subject matter of any one of Examples 117-123, and optionally, wherein the first radio comprises a Wireless Local Area Network (WLAN) radio.

Example 125 includes the subject matter of any one of Examples 117-124, and optionally, wherein the second radio comprises a cellular radio.

Example 126 includes the subject matter of Example 125, and optionally, wherein the cellular radio comprises a Long Term Evolution (LTE) radio.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A multi-radio device comprising:
a first radio to communicate over a first wireless network;
a first controller to control said first radio;
a second radio to communicate over a second wireless network;
a second controller to control said second radio; and
an interface to communicate signaling messages between said first and second controllers,
wherein said first controller is to send to said second controller a request to transmit by asserting a first signaling bit and setting a second signaling bit to a first value indicating said first signaling bit includes said request to transmit, the request to transmit indicating a request to allow said first radio to transmit over the first wireless network, the first controller is to assert a transmit indication over said interface by asserting the first signaling bit and setting the second signaling bit to a second value indicating said first signaling bit includes said transmit indication, the transmit indication to indicate actual transmission by said first radio over the first wireless network,
and wherein said second controller is to assert a transmit-allowed signal over said interface to indicate that said request to transmit is granted, or to de-assert said transmit-allowed signal to indicate that said request to transmit is denied.

2. The multi-radio device of claim 1, wherein said first controller is to send the request to transmit by asserting a transmit-on signal prior to a time for transmitting over said first network.

3. The multi-radio device of claim 1, wherein said first controller is to control communication of a third radio over a third wireless network, wherein said second controller is to send a first transmit allowed signal to indicate if a request to transmit over said first wireless network is granted, and a second transmit allowed signal to indicate if a request to transmit over said third wireless network is granted.

4. The multi-radio device of claim 3, wherein said first radio comprises a Bluetooth radio, and said third radio comprises a Wireless Local Area Network (WLAN) radio.

5. The multi-radio device of claim 1, wherein said request to transmit includes a priority indication to indicate said request to transmit has a first priority, or a second priority, higher than the first priority.

6. The multi-radio device of claim 1, wherein said second controller is to assert a downlink synchronization signal to indicate a timing of a downlink subframe over said second wireless network.

7. The multi-radio device of claim 1, wherein said first radio comprises a Bluetooth (BT) radio.

8. The multi-radio device of claim 7, wherein said request to transmit includes an indication of a BT transmit power and a BT transmit channel.

9. The multi-radio device of claim 1, wherein said first radio comprises a Wireless Local Area Network (WLAN) radio.

10. The multi-radio device of claim 1, wherein said second radio comprises a cellular radio.

11. The multi-radio device of claim 1 being a mobile device including one or more antennas, a processor, and a memory.

12. A multi-radio device comprising:
a first radio to communicate over a first wireless network;
a first controller to control said first radio;
a second radio to communicate over a second wireless network;
a second controller to control said second radio; and
an interface to communicate signaling messages between said first and second controllers,
wherein said first controller is to send to said second controller a request to receive, the request to receive indicating a request to allow said first radio to receive over the first wireless network,
wherein said second controller is to select between granting said request to receive and denying said request to receive, and when, granting said request to receive, said controller is to send over said interface a transmit-off signal to indicate a time period during which said second radio is not to transmit over said second wireless network, said second controller is to receive said request to receive during a sub-frame period of said second wireless network, and to send said transmit-off signal during said sub-frame period, said second controller is to assert a transmit indication signal a predefined assert-offset time prior to beginning an uplink transmission over said second wireless network, and to de-assert the transmit indication signal a predefined de-assert-offset time after ending the uplink transmission over said second wireless network, said second controller is to send said transmit-off signal, prior to de-asserting said transmit indication signal.

13. The multi-radio device of claim 12, wherein said second controller is to terminate an uplink transmission over said second wireless network, when selecting to grant said request to receive during said uplink transmission.

14. The multi-radio device of claim 12, wherein said request to receive includes a priority indication to indicate said request to receive has a first priority, or a second priority, higher than the first priority.

15. The multi-radio device of claim 12 being a mobile device including one or more antennas, a processor, and a memory.

16. A product including one or more tangible computer-readable non-transitory storage media comprising computer-executable instructions operable to, when executed by at least one computer processor, enable the at least one computer processor to implement operations at a multi-radio device including a first controller to control a first radio to communicate over a first wireless network, and a second controller to control a second radio to communicate over a second wireless network, operations comprising:
asserting a transmit indication over an interface by asserting a first signaling bit and setting a second signaling bit to a first value indicating said first signaling bit includes said transmit indication, the transmit indication to indicate to said second controller actual transmission by said first radio over the first wireless network;
sending a request to transmit from said first controller to said second controller by asserting the first signaling bit and setting the second signaling bit to a second value indicating said first signaling bit includes said request to transmit, the request to transmit indicating a request to allow said first radio to transmit over the first wireless network; and
selecting between asserting and de-asserting a transmit-allowed signal from the second controller to the first controller, wherein asserting said transmit-allowed signal is to indicate that said request to transmit is granted, and de-asserting said transmit-allowed signal is to indicate that said request to transmit is denied.

17. The product of claim 16, wherein said first controller is to control communication of a third radio over a third wireless network, the operations comprise sending from said second controller a first transmit allowed signal to indicate if a request to transmit over said first wireless network is granted, and a second transmit allowed signal to indicate if a request to transmit over said third wireless network is granted.

18. A product including one or more tangible computer-readable non-transitory storage media comprising computer-executable instructions operable to, when executed by at least one computer processor, enable the at least one computer processor to implement operations at a multi-radio device including a first controller to control a first radio to communicate over a first wireless network, and a second controller to control a second radio to communicate over a second wireless network, the operations comprising:

asserting a transmit indication signal from the second controller to the first controller a predefined assert-offset time prior to beginning an uplink transmission over said second wireless network;

sending a request to receive from said first controller to said second controller, the request to receive indicating a request to allow said first radio to receive over the first wireless network;

at said second controller, selecting between granting said request to receive and denying said request to receive;

when granting said request to receive, sending from said second controller to said first controller a transmit-off signal to indicate a time period during which said second radio is not to transmit over said second wireless network; and de-asserting the transmit indication signal a predefined de-assert-offset time after ending the uplink transmission over said second wireless network, said sending the transmit-off signal is prior to de-asserting said transmit indication signal.

19. The product of claim 18, wherein the operations comprise terminating an uplink transmission over said second wireless network, when selecting to grant said request to receive during said uplink transmission.

20. The product of claim 18, wherein said request to receive includes a priority indication to indicate said request to receive has a first priority, or a second priority, higher than the first priority.

* * * * *

UNITED STATES PATENT AND TRADEMARK OFFICE
CERTIFICATE OF CORRECTION

PATENT NO. : 9,532,370 B2
APPLICATION NO. : 14/472404
DATED : December 27, 2016
INVENTOR(S) : Assi Jakoby et al.

Page 1 of 1

It is certified that error appears in the above-identified patent and that said Letters Patent is hereby corrected as shown below:

In the Claims

In Column 38, Line 45, in Claim 16, delete "operations comprising:" and insert -- the operations comprising: --, therefor.

Signed and Sealed this
Second Day of May, 2017

Michelle K. Lee
*Director of the United States Patent and Trademark Office*